United States Patent
Ando

(10) Patent No.: US 9,292,469 B2
(45) Date of Patent: Mar. 22, 2016

(54) I/O DEVICE MANAGEMENT METHOD, COMPUTER SYSTEM, AND I/O DEVICE MANAGEMENT PROGRAM PRODUCT

(75) Inventor: Masahiko Ando, Yokohama (JP)

(73) Assignee: HITACHI, LTD., Tokyo (JP)

( * ) Notice: Subject to any disclaimer, the term of this patent is extended or adjusted under 35 U.S.C. 154(b) by 479 days.

(21) Appl. No.: 13/696,903

(22) PCT Filed: Jun. 1, 2010

(86) PCT No.: PCT/JP2010/059582
§ 371 (c)(1),
(2), (4) Date: Dec. 11, 2012

(87) PCT Pub. No.: WO2011/151930
PCT Pub. Date: Dec. 8, 2011

(65) Prior Publication Data
US 2013/0080610 A1 Mar. 28, 2013

(51) Int. Cl.
*G06F 15/177* (2006.01)
*G06F 3/06* (2006.01)

(52) U.S. Cl.
CPC ............ *G06F 15/177* (2013.01); *G06F 3/0613* (2013.01); *G06F 3/0635* (2013.01); *G06F 3/0689* (2013.01)

(58) Field of Classification Search
CPC ... G06F 15/177; G06F 3/0635; G06F 3/0689; G06F 3/067; G06F 3/061; G06F 3/0613
See application file for complete search history.

(56) References Cited

U.S. PATENT DOCUMENTS

| | | | |
|---|---|---|---|
| 5,297,262 A * | 3/1994 | Cox et al. | 710/36 |
| 2003/0097370 A1 | 5/2003 | Yamamoto | |
| 2005/0267963 A1 | 12/2005 | Baba et al. | |
| 2006/0031389 A1 * | 2/2006 | Shimozono et al. | 709/217 |
| 2008/0126525 A1 | 5/2008 | Ueoka et al. | |
| 2009/0187675 A1 | 7/2009 | Kinoshita et al. | |

FOREIGN PATENT DOCUMENTS

| | | |
|---|---|---|
| JP | 200-200253 A | 7/2000 |
| JP | 2005-301488 A | 10/2005 |
| JP | 2008-083939 A | 4/2008 |
| JP | 2009-075718 A | 4/2009 |
| JP | 2009-175913 A | 8/2009 |

* cited by examiner

*Primary Examiner* — Jonathan Bui
(74) *Attorney, Agent, or Firm* — Mattingly & Malur, PC

(57) ABSTRACT

An I/O device management method of a computer system including a computer, an I/O device, an I/O switch assigning the I/O device to the computer, and a management computer of managing the I/O device, in which a process of the management processor includes a step of acquiring a piece of configuration information of the I/O device assigned to the computer, and a piece of configuration information of a network connected with I/O device, a step of acquiring a flow amount indicating an amount of a data transmitted and received via the I/O device for each I/O type, a step of determining the I/O device of changing an assignment to the computer based on the pieces of acquired information, and a step of issuing an assignment change instruction to the I/O switch.

17 Claims, 26 Drawing Sheets

FIG. 8

I/O SWITCH MANAGEMENT TABLE

| I/O SWITCH IDENTIFIER | PORT NUMBER | CONNECTION DESTINATION | CONNECTION DESTINATION IDENTIFIER | STATE | CONSUMED BAND RATE | BAND RESTRICTION RANGE | SHARING USE |
|---|---|---|---|---|---|---|---|
| SW1 | 0 | NIC | MAC1 | NORMAL | 50% | 20-90 | POSSIBLE |
| | 1 | HBA | WWN1 | NORMAL | 100% | 50-70 | POSSIBLE |
| | 2 | NIC | MAC2 | NORMAL | 50% | 20-90 | POSSIBLE |
| | 3 | HBA | WWN2 | NORMAL | 10% | 50-70 | POSSIBLE |
| | 4 | HOST | HOST1 | NORMAL | 80% | — | — |
| | 5 | HOST | HOST2 | NORMAL | 25% | — | — |
| | 6 | HOST | HOST3 | NORMAL | 0% | — | — |
| | 7 | HOST | HOST4 | NORMAL | 0% | — | — |
| SW2 | 0 | NIC | MAC3 | NORMAL | 80% | 20-90 | POSSIBLE |
| | 1 | HBA | WWN3 | NORMAL | 25% | — | IMPOSSIBLE |
| | 2 | NIC | MAC3 | NORMAL | 10% | 50-70 | POSSIBLE |
| | 3 | HBA | WWN4 | NORMAL | 50% | 50-70 | POSSIBLE |
| | 4 | HOST | HOST5 | NORMAL | 80% | — | — |
| | 5 | HOST | HOST6 | NORMAL | 50% | — | — |
| | 6 | HOST | HOST7 | NORMAL | 0% | — | — |
| | 7 | CNA | MAC5 | NORMAL | 80%(LAN) / 20%(SAN) | 20-90 | POSSIBLE |

FIG. 9

SERVER MANAGEMENT TABLE

112

| SERVER IDENTIFIER (1121) | PROCESSOR CONFIGURATION (1122) | MEMORY CAPACITY (1123) | I/O DEFINITION (1124) | SERVICE TYPE (0: DEVICE) (1: SWITCH) (1125) |
|---|---|---|---|---|
| HOST1 | PROCESSOR1 2GHz×2 | 4GB | DEFINITION 1<br>DEFINITION 2<br>DEFINITION 3 | 0 |
| HOST2 | PROCESSOR1 1GHz | 2GB | DEFINITION 1<br>DEFINITION 2 | 0 |
| HOST3 | PROCESSOR1 1GHz | 2GB | DEFINITION 1<br>DEFINITION 2 | 1 |
| HOST4 | PROCESSOR1 1GHz | 2GB | DEFINITION 1<br>DEFINITION 2 | 0 |

FIG.10

SERVER I/O CONFIGURATION INFORMATION TABLE 113

| DEFINITION | I/O SWITCH IDENTIFIER | PORT NUMBER | CONNECTION DEVICE | COMMUNICATION DESTINATION | IMPORTANCE DEGREE |
|---|---|---|---|---|---|
| 1 | SW1 | 0 | HBA | SAN1 | High |
|  | SW1 | 2 | HBA | SAN2 | High |
|  | SW1 | 7 | HBA | SAN3 | Low |
|  | SW2 | 3 | NIC | G/W1 | High |
| 2 | SW1 | 0 | HBA | SAN1 | High |
|  | SW1 | 2 | HBA | SAN2 | High |
|  | SW1 | 8 | NIC | G/W2 | High |
|  | SW2 | 3 | NIC | G/W1 | Low |
| 3 | SW1 | 0 | HBA | SAN1 | High |
|  | SW1 | 2 | HBA | SAN2 | High |
|  | SW2 | 3 | NIC | G/W1 | High |
|  | SW2 | 7 | SCSI | DVD-RPM | High |

FIG.11

DEVICE POOL MANAGEMENT TABLE

| I/O SWITCH IDENTIFIER ~1141 | PORT NUMBER ~1142 | ASSIGNED STATE ~1143 | DEVICE POOL ASSIGNMENT ~1144 |
|---|---|---|---|
| SW1 | 0 | ASSIGNED | — |
| | 1 | ASSIGNED | — |
| | 2 | ASSIGNED | — |
| | 3 | ASSIGNED | — |
| | 4 | ASSIGNED | — |
| | 5 | NOT ASSIGNED YET | DEVICE POOL 1 |
| | 6 | ASSIGNED | |
| | 7 | ASSIGNED | — |
| SW2 | 0 | ASSIGNED | — |
| | 1 | ASSIGNED | — |
| | 2 | ASSIGNED | — |
| | 3 | ASSIGNED | — |
| | 4 | ASSIGNED | — |
| | 5 | ASSIGNED | |
| | 6 | NOT ASSIGNED YET | DEVICE POOL 2 |
| | 7 | NOT ASSIGNED YET | |

FIG.12

PORT MANAGEMENT TABLE

| PHYSICAL PORT NUMBER ~4061 | ASSIGNED GROUP ~4062 | LOGICAL PORT NUMBER ~4063 |
|---|---|---|
| 0 | 0 | 0 |
| 1 | 0 | 1 |
| 2 | 1 | 0 |
| 3 | 1 | 1 |
| 4 | 0 | 0,1 |
| 5 | — | — |
| 6 | — | — |
| 7 | 1 | 0,1 |

I/O DEVICE MANAGEMENT METHOD, COMPUTER SYSTEM, AND I/O DEVICE MANAGEMENT PROGRAM PRODUCT

FIELD OF THE INVENTION

The present invention relates to a computer system which carries out a network communication, particularly relates to a technology for increasing an I/O transfer efficiency in an environment of being connected to a client system via different types of plural network communications.

BACKGROUND OF THE INVENTION

According to a processing distribution system of a background art, loads are distributed by determining a network path which is used by a unit of a processing program in order to increase an I/O transfer efficiency. Also, a processing performance of a processing distribution system is improved by determining a number of network paths which are used for realizing an aimed processing performance by editing and analyzing information showing a past processing result as statistical analysis information (for example, refer to Japanese Unexamined Patent Application Publication No. 2000-200253).

Japanese Unexamined Patent Application Publication No. 2000-200253 describes a processing system which prevents a reduction in a throughput of transactions that occur by concentrating a load on a specific communication resource and a specific server resource by using information of presence/absence of a failure, a load, and an operational state of the communication resource in a database load distribution processing system that distributes loads of accesses to distributed databases that are managed by plural servers. Thereby, an efficiency of processing transactions can be increased.

SUMMARY OF THE INVENTION

According to a computer system including plural transfer resources (hereinafter, referred to as I/O device), it is necessary to select an I/O device used in consideration of a type of a network of SAN/LAN or the like connectable by the I/O device, and a network topology connected to the I/O device other than the information of a load, presence/absence of a failure, and a operational state of the I/O device. That is, a restriction is imposed on a network path and a target system which are accessible by an HBA device using an SAN network, or NIC using LAN.

Therefore, there is a case where an access cannot be made even to an I/O device having the same type of a connectable network.

Even when a network path used is changed by preparing plural network paths for respective types of connectable networks and using load information in I/O devices in correspondence with the network paths as in the background art, loads applied on the I/O devices are biased, and therefore, the I/O transfer efficiency is reduced.

For example, in a case where plural computer systems share to use a physical I/O device of an I/O configuration by using a virtualizing technology, although a computer system can control the I/O device that is managed by the corresponding computer system, network paths used cannot be controlled, and therefore, loads applied on the I/O device are biased.

There poses a problem as follows in a computer system integrating SAN and LAN by using an FcoE (Fiber Channel over Ethernet) protocol which is a technology of integrating networks of SAN and LAN.

In the computer system using the FCoE protocol, even when a network path is changed based on loads applied on a total of I/O devices, a load which is applied on a single I/O device differs for each type of a connectable network, and therefore, a concentration of a load for each type of the connectable network cannot be resolved. That is, even in a case where loads are not applied on a total of I/O devices, there is a case where the load is concentrated on a network of either one of SAN and LAN.

In a case where there occurs an access exceeding an entire band which can be used by an I/O device, even when a path used is changed, the I/O transfer efficiency is reduced, and the I/O transfer efficiency is reduced until the access is reduced to be less than a band which can be used by the I/O device.

It is an object of the present invention to resolve the problem described above. That is, in a computer system, there is provided a technology which can shorten I/O processing time by preventing a load from being concentrated on a specific I/O device by controlling flow amounts of I/O devices for respective types of connectable networks.

It is another object of the present invention to provide a technology which can prevent a reduction in an I/O transfer efficiency caused by a deficiency in a band of an I/O device for each type of a connectable network by managing used bands of plural I/O devices by a computer system.

A representative aspect of the present invention is shown as follows. That is, there is provided an I/O device management method in a computer system including a computer, plural I/O devices connected to plural networks having different network configurations, I/O switches assigning the I/O devices to the computer so as to be able to communicate with the networks, and a management computer managing the I/O devices assigned to the computer. The I/O device management method is featured in that the management computer includes a first processor, a first memory connected to the first processor, and a first network interface connected to the first processor, the computer includes a second processor, a second memory connected to the second processor, and a second network interface connected to the second processor, and the method includes a first step of acquiring I/O device configuration information of the I/O device assigned to the computer, and network configuration information of the network connected with the I/O device assigned to the computer by the management computer, a second step of acquiring a flow amount indicating an amount of a data transmitted and received via the I/O device assigned to the computer for each I/O type which is a type of the data transmitted and received via the I/O device by the management computer, a third step of determining the I/O device changing an assignment to the computer based on the flow amount acquired for each of the I/O type, the acquired I/O device configuration information, and the acquired network configuration information by the management computer, and a fourth step of issuing an assignment change instruction for changing the assignment of the determined I/O device to the I/O switch by the management computer.

According to the aspect of the present invention, the I/O transfer efficiency can be increased, since there can be executed the assignment of the I/O device in consideration of the I/O type in the I/O device and the network configuration.

BRIEF DESCRIPTION OF THE DRAWINGS

FIG. 8 is an explanatory diagram showing an example of an I/O switch management table included by a management server according to an embodiment of the present invention;

FIG. 9 is an explanatory diagram showing a server management table included by a management server according to an embodiment of the present invention;

FIG. 10 is an explanatory diagram showing a server I/O configuration information table included by a management server according to an embodiment of the present invention;

FIG. 11 is an explanatory diagram showing a device pool management table included by a management server according to an embodiment of the present invention;

FIG. 12 is an explanatory diagram showing a port management table included by an I/O switch according to an embodiment of the present invention;

DETAILED DESCRIPTION OF THE PREFERRED EMBODIMENTS

An explanation will be given of an embodiment of the present invention in reference to the drawings as follows.

Figure 1:
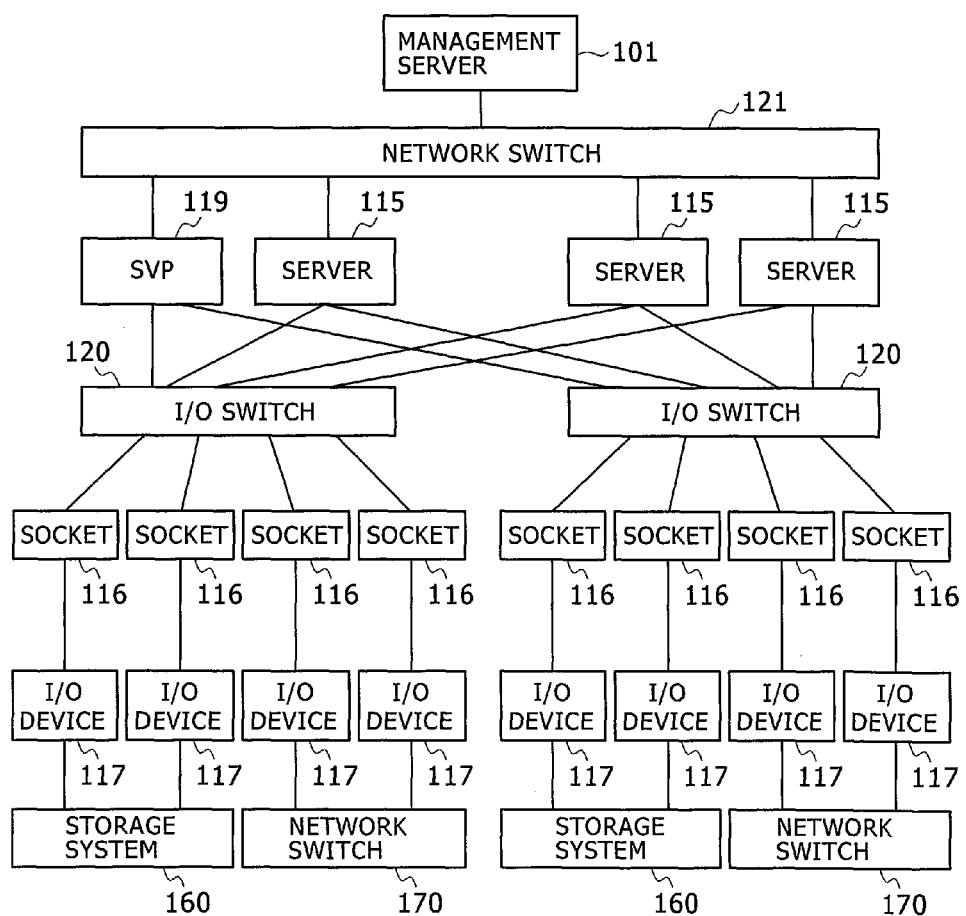
FIG. 1 is a block diagram of explaining a configuration of a computer system according to an embodiment of the present invention.

FIG. 1 is a block diagram of explaining a configuration example of a computer system according to an embodiment of the present invention.

A computer system is configured by a management server 101, a network switch 121, a server 115, SVP 119, an I/O switch 120, a socket 116, an I/O device 117, a storage system 160, and a network switch 170.

The management server 101 manages the server 115, the I/O switch 120, and the I/O device 117. A description will be given later of the management server 101 in reference to FIG. 2.

The server 115 is a computer which executes a prescribed processing. A description will be given later of the server 115 in reference to FIG. 3.

As shown in FIG. 1, the server 115 is connected to the management server 101 via the network switch 121. The server 115 is connected to the I/O switch 120, and is connected to the I/O device 117 via the socket 116 connected to a port of the I/O switch 120.

The I/O switch 120 connects the server 115 and the I/O device 117. The I/O switch 120 manages a logical connection (logical path) between the server 115 and the I/O device 117. The server 115 and the I/O device 117 are brought into a communicatable state by setting the logical path. In the following, setting of a logical path is described as assigning the I/O device 117 to the server 115.

A description will be given later of the I/O switch 120 in reference to FIG. 4.

The I/O device 117 is a device for connecting the server 115 and the storage system 160 or the network switch 170.

The I/O device 117 is a device for inputting and outputting data outputted from the server 115 and data inputted to the server 115. As the I/O device 117, there are conceivable a network interface card (NIC) for connecting to LAN, a host bus adapter (HBA) for connecting to SAN, and CNA (Converged Network Adapter) including FCoE (Fiber Channel over Ethernet) protocol. According to the present embodiment, the I/O device 117 may include an adapter in accordance with a protocol used in communication, and adapters included in the respective I/O devices 117 may differ from each other.

There can be anticipated a reduction and simplification of cable connection, a reduction in a number of adapters necessary for respective hosts, and a reduction in an electric power by including a CNA device by the I/O device 117.

SVP 119 monitors a state of a hardware included in each server 115, and controls a power source. A description will be given later of SVP 119 in reference to FIG. 5.

As shown in FIG. 1, SVP 119 is connected to the management server 101 via the network switch 121.

The network switch 121 and the network switch 170 are connected to a network of LAN.

The storage system 160 stores data used by the server 115. The storage system 160 includes plural disc devices (not illustrated). The storage system 160 can create one or more of a storage area(s) by using plural disc devices, and assign the storage region(s) to respective servers 115. The storage system 160 may include SSD (Solid State Drive) other than the disc device as a storage medium.

According to the present embodiment, an I/O device pool (not illustrated) is configured from the I/O devices 117 which are not assigned to the server 115.

Figure 2:
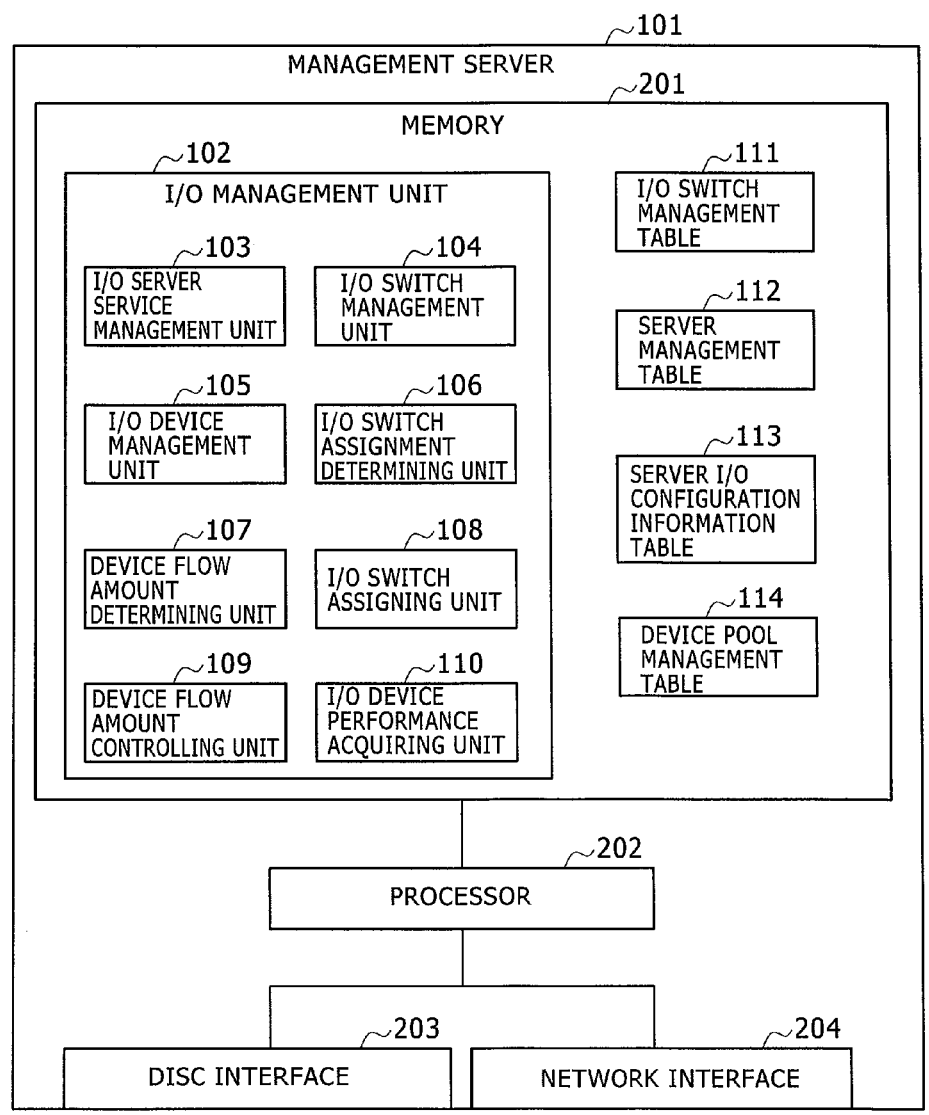
FIG. 2 is a block diagram of explaining a configuration example of a management server according to an embodiment of the present invention.

FIG. 2 is a block diagram of explaining a configuration example of the management server 101 according to an embodiment of the present invention.

The management server 101 includes a processor 202, a memory 201, a disc interface 203, and a network interface 204.

The processor 202 executes a program stored in the memory 201.

The memory 201 stores a program executed by the processor 202, and information necessary for executing the program.

The memory 201 stores an I/O management unit 102, an I/O switch management table 111, a server management table 112, a server I/O configuration information table 113, and a device pool management table 114.

The I/O management unit 102 manages and controls the I/O device 117. The I/O management unit 102 includes an I/O service management unit 103, an I/O switch management unit 104, an I/O device management unit 105, an I/O switch assignment determining unit 106, an I/O device flow amount determining unit 107, an I/O switch assigning unit 108, an I/O device flow amount controlling unit 109, and an I/O performance acquiring unit 110.

The I/O service management unit 103 supervises a processing with regard to the I/O device 117. The I/O switch management unit 104 or the I/O device management unit 105 starts activation by the I/O management unit 103. A description will be given later of a processing executed by the I/O service management unit 103 in reference to FIG. 14.

The I/O switch management unit 104 determines which of an addition processing of the I/O device 117, or an unassignment processing of the I/O device 117 is to be executed. Here, the addition processing of the I/O device 117 is a processing of newly assigning an I/O device to the server 115. The unassignment processing of the I/O device 117 is a processing of unassigning the I/O device 117 assigned to the server 115.

A description will be given later of the processing executed by the I/O switch management unit 104 in reference to FIG. 15A and FIG. 15B.

In the following, the addition processing of the I/O device 117 is described as the addition processing, and the unassignment processing of the I/O device 117 is described as the unassignment processing.

The I/O switch assignment determining unit 106 executes the addition processing, and the unassignment processing. A description will be given later of a processing executed by the I/O switch assignment determining unit 106 in reference to FIG. 16.

The I/O switch assigning unit 108 reflects a result of a processing executed by the I/O switch assignment determining unit 106 to the server management table 112 described later. A description will be given later of a processing executed by the I/O switch assigning unit 108 in reference to FIG. 17.

The I/O device management unit 105 executes a changing processing of changing the I/O device 117 assigned to the server 115 to other I/O device 117. A description will be given later of a processing executed by the I/O device management unit 105 in reference to FIG. 20.

The I/O device flow amount determining unit 107 acquires an amount of data (flow amount) flowing in the I/O device 117. A description will be given of a processing executed by the I/O device flow amount determining unit 107 in reference to FIG. 21.

The I/O device flow amount controlling unit 109 determines the I/O device 117 assigned to the server 115. A description will be given later of a processing executed by the I/O device flow amount controlling unit 109 in reference to FIG. 22.

The I/O device performance acquiring unit 110 acquires information related to the I/O device 117. A description will be given later of a processing executed by the I/O device performance acquiring unit 110 in reference to FIG. 25.

The I/O switch management table 111 stores a connecting state of the I/O switch 120. A description will be given later of details of the I/O switch management table 111 in reference to FIG. 8.

The server management table 112 stores information of resources included in the server 115 and information with regard to the flow amount of the I/O device 117 assigned to the server 115. A description will be given later of details of the server management table 112 in reference to FIG. 9.

The server I/O configuration information table 113 stores a connecting state of the I/O device 117. A description will be given later of details of the server I/O configuration information table 113 in reference to FIG. 10.

The device pool management table 114 stores information with regard to an I/O device pool. A description will be given later of details of the device pool management table 114 in reference to FIG. 11.

The information stored to the respective tables is transferred to the server 115 by the processor 202 via the network interface 204.

The disc interface 203 is an interface for connecting to the storage system 160. For example, HBA is conceivable as the disc interface 203.

The network interface 204 is an interface for connecting to the network switch 170. For example, NIC is conceivable as the network interface 204.

Respective configurations included in the I/O management unit 102 are not limited to packaging shown in FIG. 2. For example, a configuration summarizing plural functions to one will do. Although an example shown in FIG. 2 includes respective ones of the disc interface 203 and the network interface 204 independently from each other, an adapter may be shared by including CNA, and a configuration communicatable with the server 115 will do.

Figure 3:
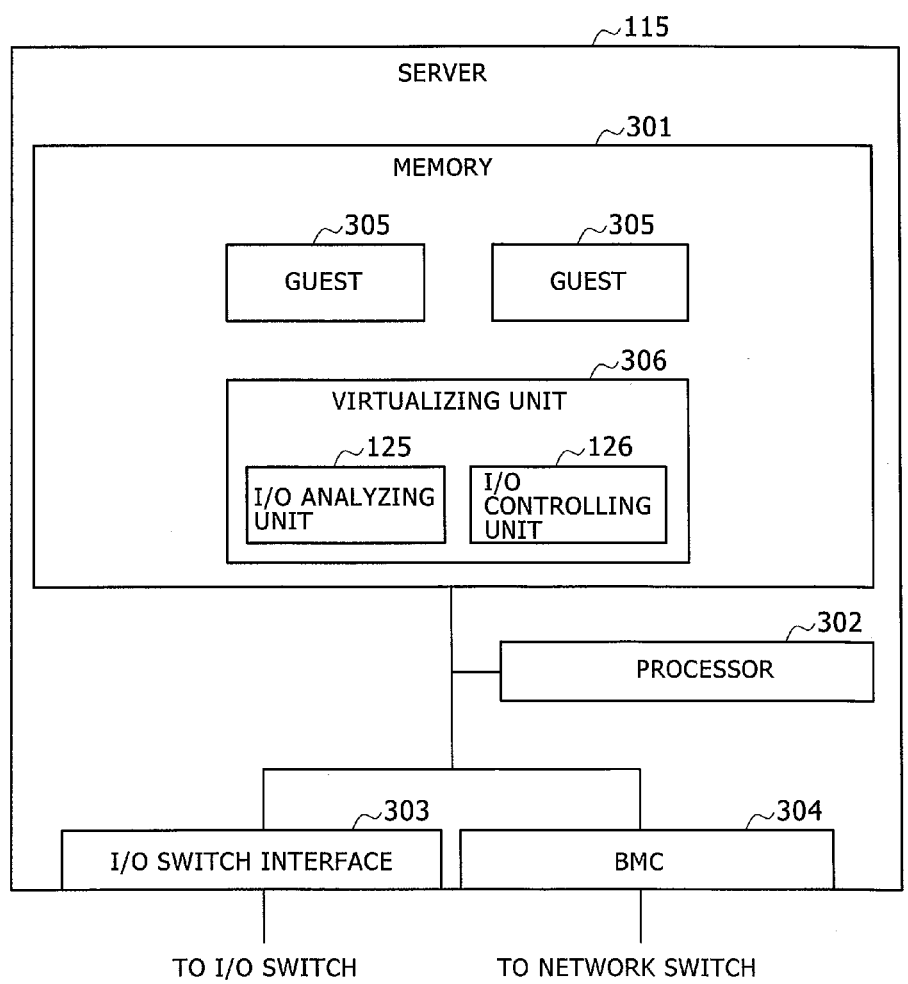
FIG. 3 is a block diagram of explaining a configuration example of a server according to an embodiment of the present invention.

FIG. 3 is a block diagram for explaining a configuration example of the server 115 according to an embodiment of the present invention.

The server 115 includes a processor 302, a memory 301, an I/O switch interface 303, and BMC (Baseboard Management Controller) 304.

The processor 302 executes a program stored to the memory 301.

The memory 301 stores a program executed by the processor 302 and information necessary for executing the program.

The memory 301 stores a virtualizing unit 306 and a guest 305.

The virtualizing unit 306 creates a virtual server on the server 115. Specifically, the virtualizing unit 306 creates an environment in which the plural guests 305 are operable. As the virtualizing unit 306, for example, a hypervisor is conceivable.

The virtualizing unit 306 includes an I/O analyzing unit 125, and an I/O controlling unit 126.

The I/O analyzing unit 125 analyzes an I/O request transmitted from the guest 305, and determines the I/O device 117 which transmits the I/O request. A description will be given later of a processing executed by the I/O analyzing unit 125 in reference to FIG. 23.

The I/O controlling unit 126 transmits the I/O request transmitted from the guest 305 from the I/O device 117 which is determined by the I/O analyzing unit 125. A description will be given later of a processing executed by the I/O controlling unit 126 in reference to FIG. 24.

The guest 305 executes a prescribed processing. The guest 305 includes OS and an application executed on the OS.

Although in an example shown in FIG. 3, an explanation has been given of a case where the plural guests 305 are operated by the virtualizing unit 306, for example, there may be constructed a configuration in which OS is stored on the memory 301 instead of the virtualizing unit 306, and the processor 302 executes the OS. In this case, OS may include functions of receiving an I/O request for an application, and distributing the I/O request.

According to the present embodiment, the I/O request includes an I/O request for the network switch 170 and an I/O request for the storage system 160. In the following, a type of the I/O request described above is described as I/O type. There may be a type of other I/O request.

The I/O switch interface 303 is an interface for connecting to the I/O switch 120. The server 115 is connected to the I/O switch 120 via the I/O switch interface 303, and can use the I/O device 117 connected to the I/O switch 120. BMC 304 is an interface for connecting to the network switch 121.

Figure 4:
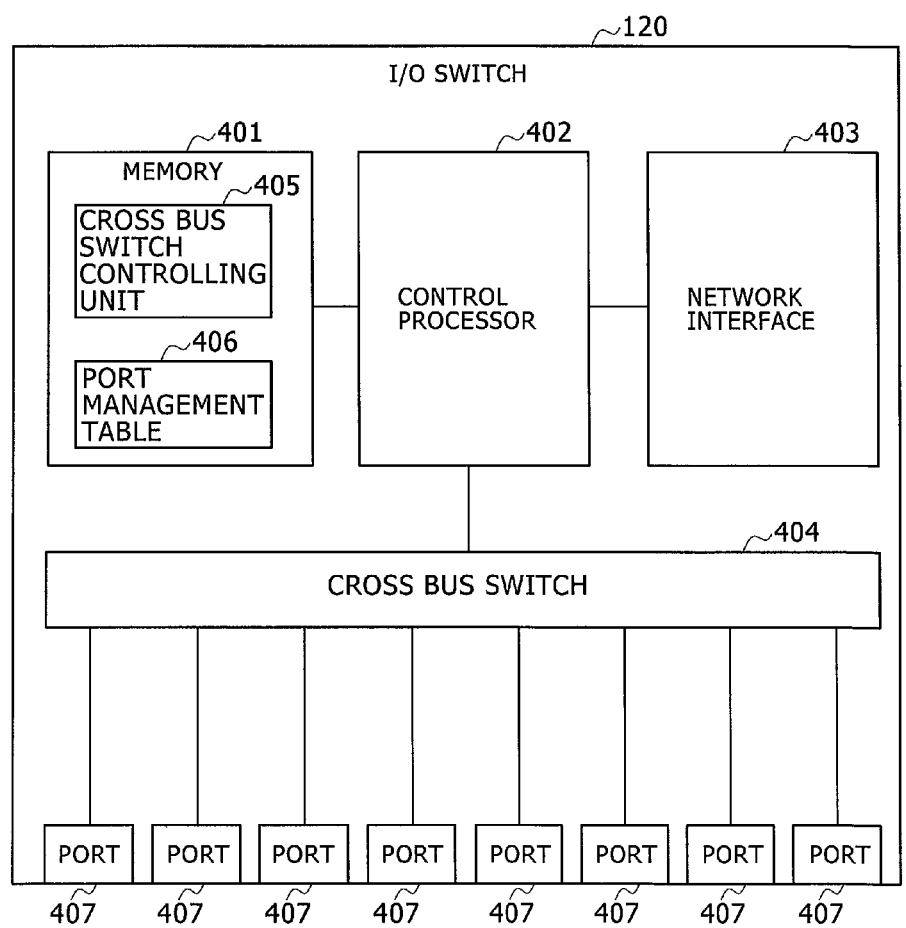
FIG. 4 is a block diagram of explaining a configuration example of an I/O switch according to an embodiment of the present invention.

FIG. 4 is a block diagram for explaining a configuration example of the I/O switch 120 according to an embodiment of the present invention.

The I/O switch 120 includes a control processor 402, a memory 401, a network interface 403, a cross bus switch 404, and a port 407.

The control processor 402 executes a program stored to the memory 401.

The memory 401 stores the program executed by the control processor 402 and information necessary for executing the program. The memory 401 stores a cross bus switch controlling unit 405 and a port management table 406.

The cross bus switch controlling unit 405 executes a control of the cross bus switch 404. The cross bus switch controlling unit 405 manages an assignment of the port 407 connected to the cross bus switch 404 and the server 115 or the I/O device 117. The cross bus switch controlling unit 405 issues an assignment change request to the cross bus switch 404.

The port management table 406 stores a state of assigning the port 407. A description will be given later of the port management table 406 in reference to FIG. 12.

The network interface 403 is the interface 403 for connecting to the management server 101.

The cross bus switch 404 establishes a correspondence between the port 407 and a logical port, and creates an assignment group which manages a correspondence relationship between the port 407 and the logical port. The cross bus switch 404 is connected to the control processor 402, and the plural ports 407 included in the I/O switch 420.

The port 407 is an interface for connecting to an external device. According to the present embodiment, the port 407 is connected to the server 115 or the I/O device 117 via the socket 116.

Figure 5:
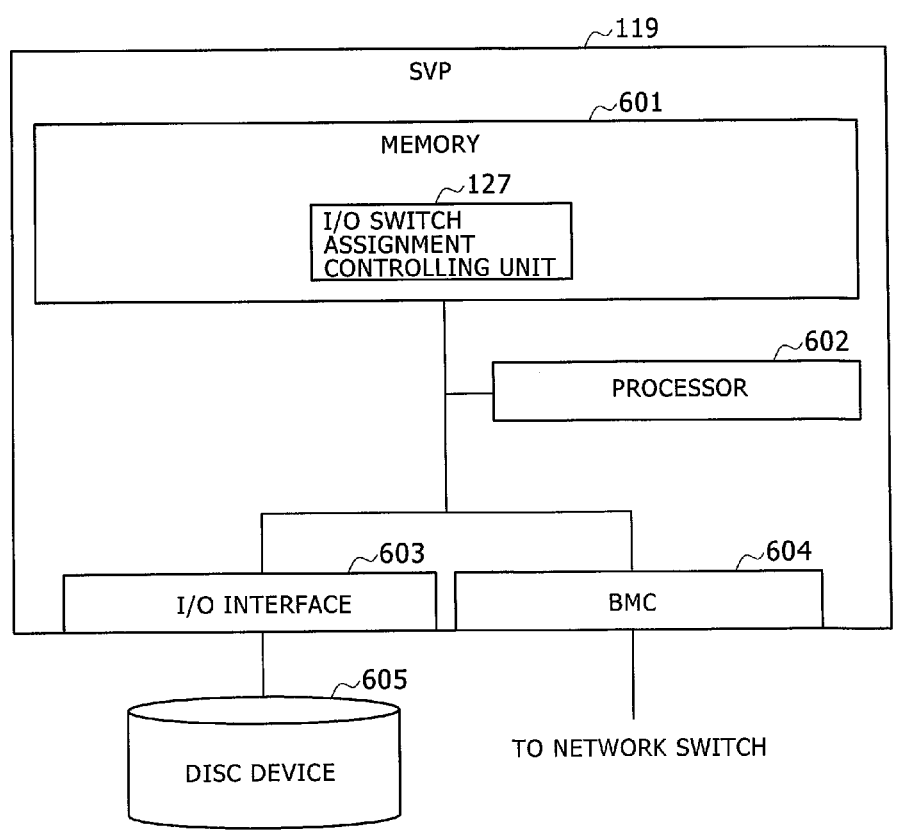
FIG. 5 is a block diagram of explaining a configuration example of SVP according to an embodiment of the present invention.

FIG. 5 is a block diagram for explaining a configuration example of SVP 119 according to an embodiment of the present invention.

SVP 119 includes a processor 602, a memory 601, an I/O interface 603, and BMC 604.

The processor 602 executes a program stored to the memory 601.

The memory 601 stores a program executed by the processor 602 and information necessary for executing the program. The memory 601 stores an I/O assignment controlling unit 127.

The I/O switch assignment controlling unit 127 receives a request of changing the I/O device 117 assigned to the server 115 from the management server 101 and issues an assignment change instruction of the I/O device 117 to the cross bus switch controlling unit 405.

A description will be given later of a processing executed by the I/O switch assignment controlling unit 127 in reference to FIG. 18.

The I/O interface 603 is an interface for connecting to a disc device 605 included by the storage system. BMC 604 is an interface for connecting to the network switch 121. SVP 119 can receive an assignment change request of the I/O device 117 from the management server 101 via BMC 604.

As shown in FIG. 5, SVP 119 includes the I/O switch assignment controlling unit 127. However, the present invention is not limited thereto. For example, there may be constructed a configuration including a function of being able to transmit the assignment change request transmitted from the management server 101 to the I/O switch 120 by the server 115.

Figure 6:
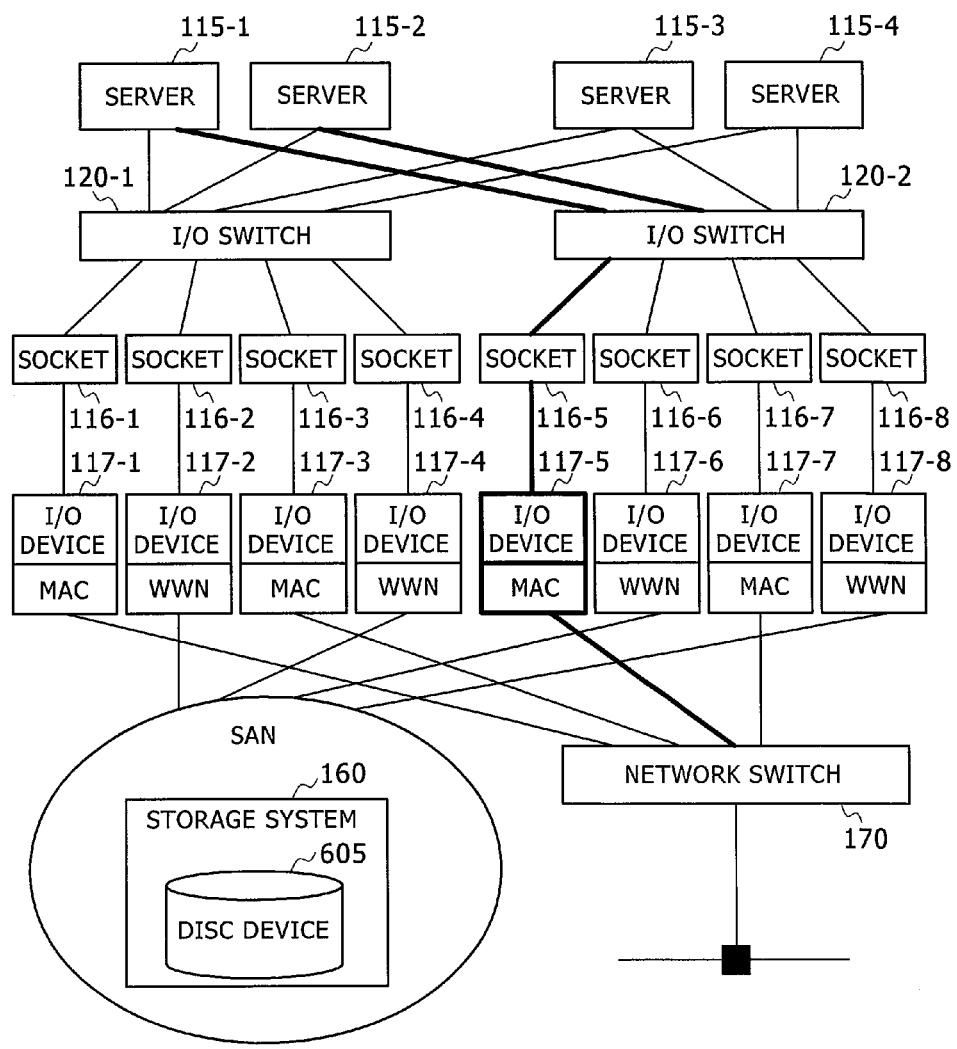
FIG. 6 is an explanatory diagram showing an example of changing an assignment of an I/O device according to an embodiment of the present invention.
Figure 7:
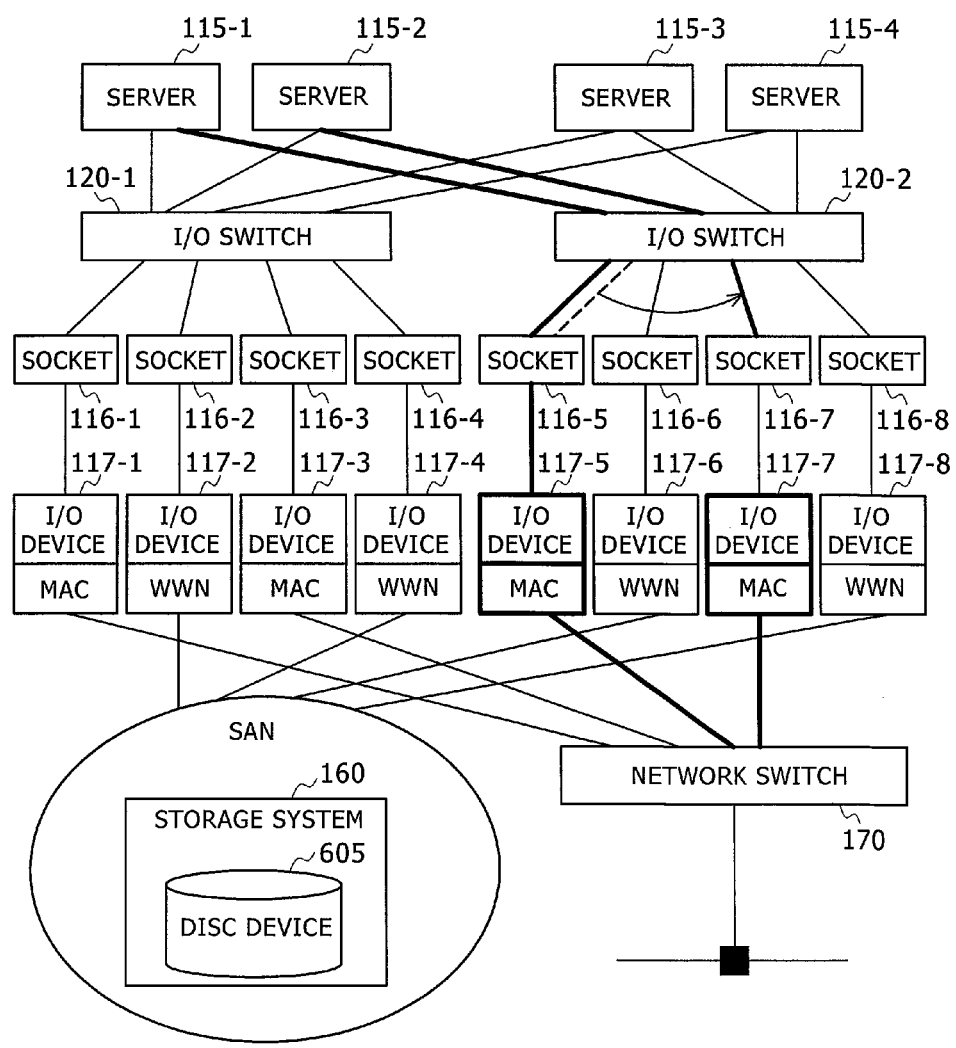
FIG. 7 is an explanatory diagram showing an example of changing an assignment of an I/O device according to an embodiment of the present invention.

FIG. 6 and FIG. 7 are explanatory diagrams showing an example of changing an assignment of the I/O device 117 according to an embodiment of the present invention.

FIG. 6 shows a configuration before changing an assignment of the I/O device 117. FIG. 7 shows a configuration after changing an assignment of the I/O device 117.

According to an example shown in FIG. 6, plural servers 115-1 through 115-4 are connected to plural I/O switches 120-1 through 120-2. The I/O switches 120-1 through 120-2 are respectively connected to I/O devices 117-1 through 117-8 via sockets 116-1 through 116-8 connected to the respective ports 407 of the I/O switches 120-1 through 120-2.

According to the example shown in FIG. 6, the I/O device 117 including NIC as an adapter and the I/O device 117 including HBA as an adapter are mixed. The I/O device 117 including NIC is connected to LAN via the network switch 170. The I/O device 117 including HBA is connected to the storage system 160 included in SAN.

The storage system 160 includes one or more of the disc device(s) 605. The servers 115-1 through 115-4 read data from the disc device 605 and write data to the disc device 605.

The I/O device 117 including NIC as an adapter holds an MAC address as an identifier for uniquely identifying the I/O device 117. The I/O device 117 including HBA as an adapter holds WWN (World Wide Name) as an identifier for uniquely identifying the I/O device 117.

Also, the I/O device 117 including NIC as an adapter is assigned with a logical port for the server 115. Here, assignment of the logical port indicates that the I/O switch 120 is set with a virtually defined logical path.

According to the example shown in FIG. 6, the I/O switch 120-1 connects the I/O devices 117-1 and 117-3 including NIC as the adapters via the sockets 116-1 and 116-2. The I/O devices 117-1 and 117-3 are connected to the network switch 170.

The I/O switch 120-1 connects the I/O devices 117-2 and 117-4 including HBA as the adapters via the sockets 116-2 and 116-4. The I/O devices 117-2 and 117-4 are connected to the storage system 160 included in SAN.

The I/O switch 120-2 connects the I/O devices 117-5 and 117-7 including NIC as the adapters via the sockets 116-5 and 116-7. The I/O devices 117-5 and 117-7 are connected to the network switch 170.

The I/O switch 120-2 connects the I/O devices 117-6 and 117-8 including HBA as the adapters via the sockets 116-6 and 116-8. The I/O devices 117-6 and 117-8 are connected to the storage system 160 included in SAN.

According to the example shown in FIG. 6, the servers 115-1 and 115-2 are assigned with the single I/O device 117-5. The servers 115-1 and 115-2 are brought into a state of being accessible to LAN via the network switch 170 connected to the I/O device 117-5.

In this case, the single I/O device 117-5 is assigned with the two servers 115-1 and 115-2, and therefore, a large communication load is applied on the single I/O device 117-5. Therefore, a usable band of the I/O device 117-5 becomes deficient, and there is a possibility of bringing about an I/O delay in the servers 115-1 and 115-2.

That is, in a case where either one server 115 of the two servers 115-1 and 115-2 transmits and receives a large amount of data, the usable band of the I/O device 117-5 becomes deficient, and there is a possibility that the other server 115 cannot access to the network switch 170 via the I/O device 117-5.

A similar problem is posed with regard to the I/O device 117 including HBA as the adapter. The similar problem is posed with regard to the I/O device 117 including CNA as the adapter.

It is conceivable to change the I/O devices 117 used for respective I/O requests in order to resolve the problem described above. However, in a computer system connectable to different networks, an IP network communication used in NIC and a fiber channel communication used in HBA are mixed. Therefore, in the I/O device 117 having different processable I/O types, connected networks differ from each other, and therefore, there is a possibility that a target of an access destination of I/O differs.

Therefore, the problem described above cannot be resolved by simply changing setting of the logical path in the I/O switch 120. That is, it is necessary to take communication paths of all of networks into a consideration in order to resolve the problem described above.

FIG. 7 is a diagram showing a state after changing the assignment of the I/O device 117 by applying the present invention.

An example shown in FIG. 7 indicates a state where the I/O device 117 assigned to either one of the server 115-1 and the server 115-2 is changed from the I/O device 117-5 to the I/O device 117-7.

According to the present invention, in a case of bringing about an IP network communication from the servers 115-1 and 115-2 to the network switch 170, a data amount (flow amount) processed by the I/O device 117-5 is periodically measured, and an I/O request is transmitted to the I/O device 117 equivalent to the assigned I/O device 117-5 for each I/O request. Thereby, a flow amount in each I/O device 117 is controlled. Here, an equivalence of the I/O device 117 indicates that the type of the I/O device 117 stays the same. That is, it is indicated that the adapter included in the I/O device 117 belongs to the same type.

According to the present invention, the occurrence of the I/O delay in the server 115 assigned with the I/O device 117 can be prevented by controlling the flow amount of the I/O device 117.

According to the present invention, in a case of selecting the I/O device 117 assigned to the server 115, a consideration is given to respective communication paths of LAN and SAN.

A case of LAN is delimited by a physical connection, a virtual network segment of setting VLAN (Virtual LAN). Therefore, it is necessary to select the I/O device 117 communicatable with a target of an access destination for each I/O request.

Also in a case of FC communication, there is conceivable a case where a state of assigning WWN held by the I/O device 117 and LU (Logical Unit) included in the storage system 160 is set by the storage system, and a virtual connection path is set in the I/O switch 120 by zoning setting included in a device included in an FC network.

That is, there is a case where the server 115 cannot access to an I/O device which is not set with the logical path. Therefore, it is necessary to select the I/O device 117 communicatable with a target of an access destination for each I/O request in consideration of a network topology.

In a case where bands of all the I/O devices 117 assigned to the server 115 are deficient, it is necessary to add an assignment of the I/O device 117 in order to prevent a delay of I/O.

According to the present invention, the I/O transfer efficiency of the server 115 can be increased by controlling a flow amount of an I/O device connected to the I/O switch 120 under an environment where plural network topologies which can be connected by the I/O device 117 are present.

The I/O transfer efficiency is increased by managing the flow amount of the I/O device 117 for each I/O type (LAN/SAN) and pertinently changing the assignment of the I/O device 117 to the server 115.

Hereinafter, an explanation will be given of a management table which is necessary for embodying the present invention.

FIG. 8 is an explanatory diagram showing an example of the I/O management table 111 included by the management server 101 according to an embodiment of the present invention.

The I/O switch management table 111 stores information of the server 115 and the I/O device 117 which are connected to the ports of the I/O switch 120. That is, the I/O switch management table 111 stores information of the server 115 and the I/O device 117 physically connected to the I/O switch 120.

The I/O switch management table 111 includes an I/O switch identifier 1111, a port number 1112, a connection destination 1113, a connection destination identifier 1114, a state 1115, a consumed band rate 1116, a band restriction range 1117, and a sharing 1118.

The I/O identifier 1111 is an identifier for uniquely identifying the I/O switch 120 in the computer system.

The port number 1112 is an identification number for identifying the port 407 of the I/O switch 120 in correspondence with the I/O identifier 1111. The port number 1112 is a number corresponded to the socket 116 connected to the port 407 of the I/O switch 120.

The connection destination 1113 is a piece of information indicating a type of the server 115 or the I/O device 117 connected to the port 407 in correspondence with the port number 1112.

For example, in a case of connecting the I/O device 117 including NIC as an adapter to the port 407, "NIC" is stored. In a case of connecting the I/O device 117 including NBA as an adapter to the port 407, "HBA" is stored. In a case of connecting the server 115 to the port 407, "host" is stored. In a case of connecting the I/O device 117 including CAN as an adapter to the port 407, "CNA" is stored.

The connection destination identifier 1114 is an identifier for identifying the server 115 or the I/O device 117 in correspondence with the connection destination 1113. Specifically, in a case of the connection destination 1113 is "NIC", an MAC address is stored. In a case where the connection destination 1113 is "HBA", WWN is stored. In a case where the connection destination 1113 is "host", a host name is stored. In a case where the connection destination 1113 is "CNA", an MAC address is stored.

The state 1115 is a piece of information indicating a state of the server 1115 or the I/O device 117 in correspondence with the connection destination 1113. The state 1115 stores a piece of information stating that the state 1115 is a failure state or a normal state. The management server 101 can grasp the state of the server 1115 or the I/O device 117 in correspondence with the connection destination 1113 based on the state 1115.

The consumed band rate 1116 is a piece of information indicating the consumed band rate of the server 115 or the I/O device 117 in correspondence with the connection destination 1113. That is, the consumed band rate 1116 indicates a piece of information of a band which is actually used in a band which is usable for the server 115 or the I/O device 117. In a case where the connection destination 1113 is "CNA", the consumed band rate 1116 stores values for the respective I/O types, that is, for respective LAN's and respective SAN's.

The band restriction range 1117 is a piece of information indicating a restriction range of the consumed band rate which is set to the I/O device 117 in a case where the connection destination 1113 is the I/O device 117. Specifically, the band restriction range 1117 stores a lower limit value and an upper limit value of the consumed band rate.

Incidentally, the band restriction range 1117 may store either one of the upper limit value of a band to be restricted or the lower limit value of the band to be restricted.

The management server 101 determines whether the I/O device 117 assigned to the server 115 is added or deleted based on the consumed band rate 1116 and the band restriction range 117.

The sharing 1118 indicates whether plural servers 115 can share to use the I/O device 117 in a case where the connection destination 1113 is the I/O device 117. That is, the sharing 1118 stores a piece of information indicating whether it is authorized to set plural logical paths to the single I/O device 117. The sharing 1118 is a piece of information which is used in a case where the specific server 115 is made to occupy to use the I/O device 117.

FIG. 9 is an explanatory diagram showing the server management table 112 included by the management server 101 according to an embodiment of the present invention.

The server management table 112 stores a piece of information of a resource included in the server 115 which is a management object, and a flow amount controlling state.

The server management table 112 includes a server identifier 1121, a processor configuration 1122, a memory capacity 1123, an I/O definition 1124, and a service type 1125.

The server identifier 1121 is an identifier for identifying the server 115 which is a management object.

The processor configuration 1122 is a piece of configuration information of the processor 302 included by the server 115 in correspondence with the server identifier 1121. The memory capacity 1123 is a capacity of the memory 301 included by the server 115 in correspondence with the server identifier 1121.

The I/O definition 1124 is an identifier for identifying the I/O definition. Here, the I/O definition is a definition of a logical path in the server 115. The I/O definition is configured by a piece of information of the logical port which is set in the I/O switch 120. A piece of information with regard to the I/O definition is stored to the server I/O definition table 113. A description will be given later of a specific content of the I/O definition in reference to FIG. 10.

The service type 1125 is a piece of information indicating a type of an assignment changing processing of the I/O device 117.

Specifically, in a case where the service type 1125 is "0", there is executed a processing for changing an assignment of the I/O device 117 connected to the I/O switch 120. In a case where the service type 1125 is "1", there is executed a processing of adding or deleting the I/O device connected to the I/O switch 120.

FIG. 10 is an explanatory diagram showing the server I/O configuration information table 113 included by the management server 101 according to an embodiment of the present invention.

The server I/O configuration information table 113 stores a piece of configuration information of the I/O device 117.

The server I/O configuration information table 113 includes a definition 1138, an I/O identifier 1131, a port number 1132, a connection device 1133, a communication destination 1134, and an importance degree 1135.

The definition 1138 is an identifier for identifying an I/O definition.

The I/O switch identifier 1131 is an identifier for identifying the I/O switch 120. Incidentally, the I/O switch identifier 1131 is the same as the I/O identifier 1111 included in the I/O switch management table 111.

The port number 1132 is an identification number for identifying the port 407 of the I/O switch 120 in correspondence with the I/O switch identifier 1131. Incidentally, the port number 1132 is the same as the port number 1112 included in the I/O management table 111.

The connection device 1133 is a piece of information indicating a type of the I/O device 117 connected to the port 407 in correspondence with the port number 1112. That is, the connection device 1133 indicates a type of an adapter included by the I/O device 117. For example, in a case where CNA is connected to the port 407 of the I/O switch 120, the connection device 1133 stores "CNA".

The communication destination 1134 is a piece of information of a communication destination connected to the I/O device 117 in correspondence with the connection device 1134. That is, the communication destination 1134 is a piece of information of a network which can be accessed via the I/O device 117 in correspondence with the connection device 1133. The communication destination 1134 is used when the I/O device 117 which can access to the same network is retrieved.

The importance degree 1135 is an importance degree set to the I/O device 117. Specifically, in a case where an assignment of the I/O device 117 is changed, an assignment of the I/O device 117 having an importance degree of "High" is made not to be changed, and with regard to the I/O device 117 having the importance degree 1135 of "Low", the assignment of the I/O device 117 is made to be able to be changed predominantly. That is, in a case where the importance degree 1135 is "High", the server 115 transmits and receives I/O by predominantly using the I/O device 117. On the other hand, with regard to the I/O device 117 having the importance degree 1135 of "Low", it is shown that the assignment of the I/O device 117 can predominantly be changed.

For example, in a case where I/O for the certain server 115 is intended to be transmitted and received via the specific I/O device 117, "High" is stored to the importance degree 1135 of the I/O device 117.

The importance degree 1135 is used when the I/O device 117 which is used by the I/O device flow amount controlling unit 109 is determined.

According to the present embodiment, the connection destination 1113, the connection destination identifier 1114, and the connection device 1133 are pieces of information in correspondence with the I/O type. The communication destination 1134 is a piece of information in correspondence with a network topology.

FIG. 11 is an explanatory diagram showing the device pool management table 114 included by the management server 101 according to an embodiment of the present invention.

The device pool management table 114 stores a piece of information with regard to an assigned state of the I/O device 117 connected to the I/O switch 120.

The device pool management table 114 includes an I/O identifier 1141, a port number 1142, an assigned state 1143, and a device pool assignment 1144.

The I/O switch identifier 1141 is an identifier for identifying the I/O switch 120. The I/O switch identifier 1141 is the same as the I/O identifier 1111 of the I/O switch management table 111.

The port number 1142 is an identification number for identifying the port 407 of the I/O switch 120 in correspondence with the I/O identifier 1141. Incidentally, the port number 1142 is the same as the port number 1112 included in the I/O switch management table 111.

The assigned state 1143 is a piece of information indicating an assigned state of the I/O device 117 connected to the port 407 in correspondence with the port number 1142. That is, the assigned state 1143 is a piece of information indicating whether the I/O device 117 connected to the port 407 is assigned to at least one or more of the server(s) 115.

In a case where the I/O device 117 is assigned to one or more of the server(s) 115, the assigned state 1143 stores "assigned". In a case where the I/O device 117 is not assigned to any of the servers 115, the assigned state 1143 stores "not assigned yet".

The assigned state 1143 is updated when the assignment of the I/O device 117 to the server 115 is changed. The I/O device 117 in which the assigned state 1143 is "not assigned yet" becomes a candidate of the I/O device 117 which is newly assigned to the server 115.

The device pool assignment 1144 is an identifier for identifying a device pool which is configured by the plural I/O device 117. Here, the device pool is configured by one or more of the I/O device(s) 117 in which the assigned state 1143 is "not assigned yet".

FIG. 12 is an explanatory diagram showing a port management table 406 included by the I/O switch 120 according to an embodiment of the present invention.

The port management table 406 stores a correspondence relationship between plural physical ports (ports 407) included by the I/O switch 120 and a logical connection (logical port).

The port management table 406 includes a physical port number 4061, an assigned group 4062, and a logical port number 4063.

The physical port number 4061 is an identification number for identifying the port 407 included by the I/O switch 120, and is the same as the port number 1112 of the I/O switch management table 111.

The assigned group 4062 is an identifier for identifying an assigned group configured by the plural logical ports. According to the present embodiment, the assignment of the I/O device 117 to the server 115 is managed by a unit of the assigned group (refer to FIG. 13).

The physical port (port number 407) is logically connected to the logical port. Here, the logical port indicates a virtual port set in the I/O switch 120.

The logical port number 4063 is an identifier for identifying the logical port set in the I/O switch 120. The logical port number 4063 stores an identifier of the logical port that is connected to the physical port (port 407) in correspondence with the physical port number 4061.

Figure 13:
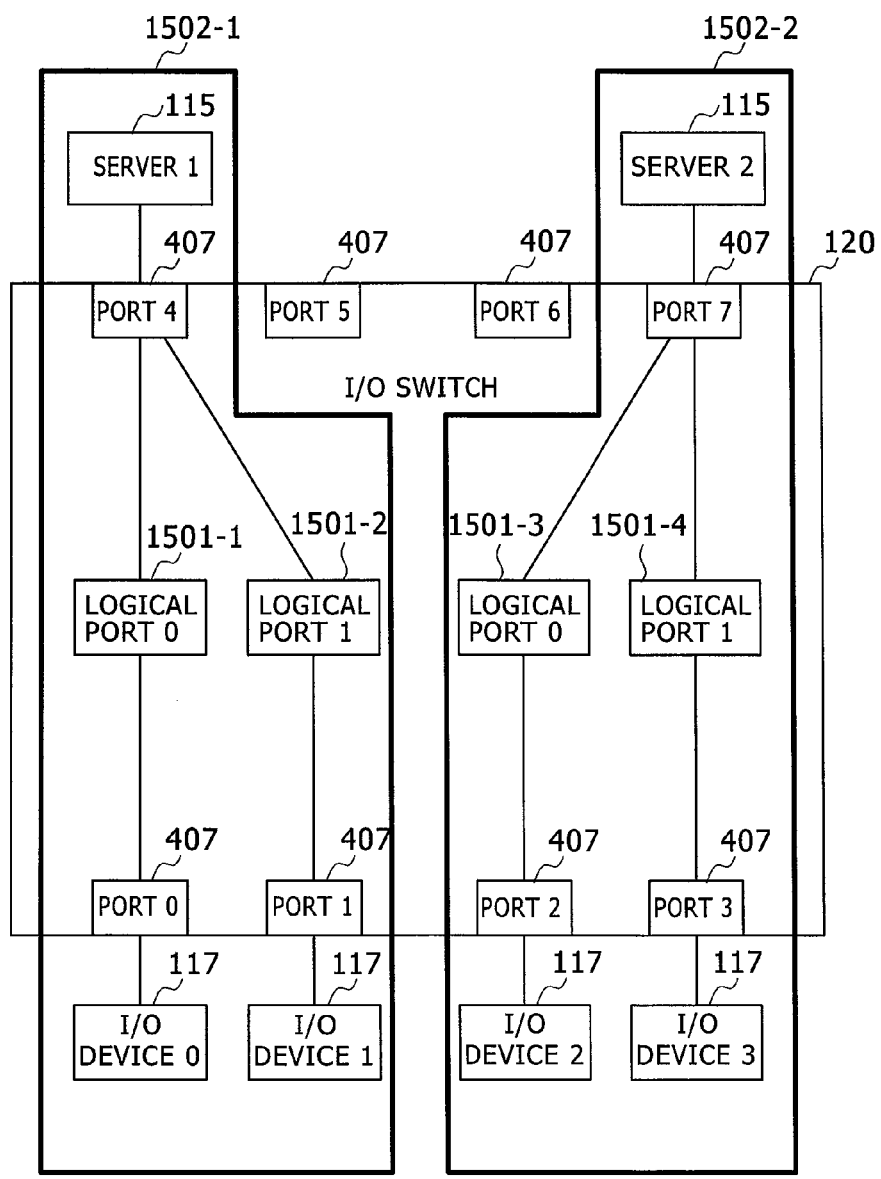
FIG. 13 is an explanatory diagram showing an example a state of assigning a physical port and a logical port in an I/O switch according to an embodiment of the present invention.

FIG. 13 is an explanatory diagram showing an example of a state of assigning the physical port and the logical port in the I/O switch 120 according to an embodiment of the present invention.

As shown in FIG. 13, the I/O switch 120 includes 8 of the ports 407.

A port 0 (407) is connected with an I/O device 0 (117), a port 1 (407) is connected with an I/O device 1 (117), a port 2 (407) is connected with an I/O device 2 (117), and a port 3 (407) is connected with an I/O device 3 (117).

A port 4 (407) is connected with a server 1 (115), and a port 7 is connected with a server 2 (115).

A logical port 0 (1501-1) connects the port 4 (407) and the port 0 (407), and a logical port 1 (1051-2) connects the port 4 (407) and the port 1 (407). The logical port 0 (1501-3) connects the port 7 (407) and the port 2 (407), and the logical port 1 (1051-4) connects the port 7 (407) and the port 3 (407).

An assigned group 1502 is created by establishing a correspondence between the port 407 included by the I/O switch 120 and the logical port 1501.

According to an example shown in FIG. 13, an assigned group 1502-1 and an assigned group 1502-2 are created. An access is set not to be able to be made between the ports 407 of the different assigned groups 1502.

A state of an assignment as shown in FIG. 13 is stored to the port management table 406.

Figure 14:
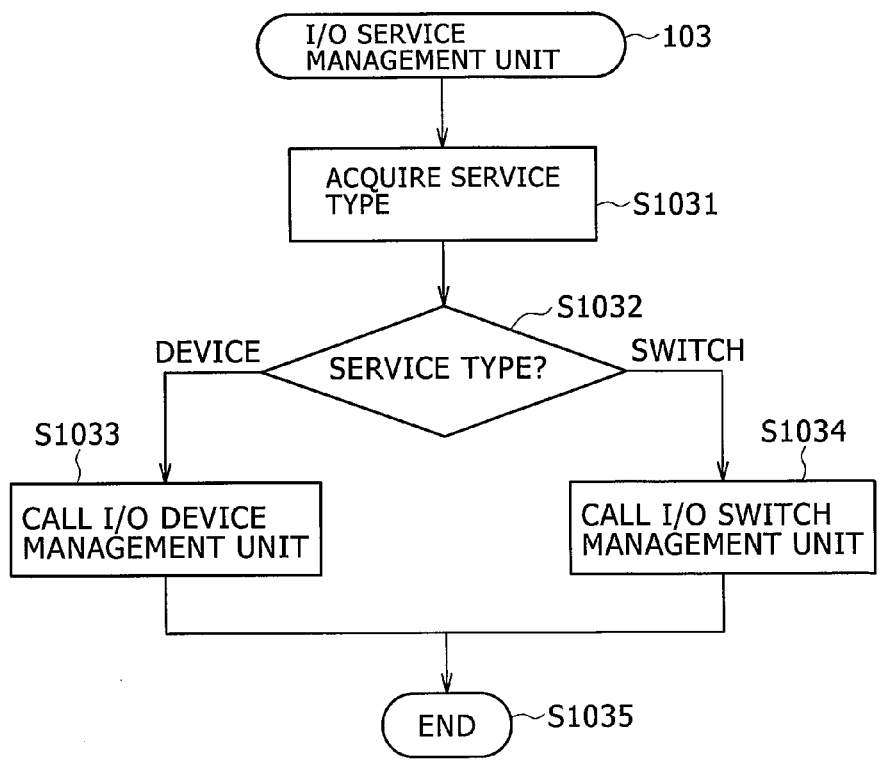
FIG. 14 is a flowchart of explaining a processing executed by an I/O service management unit included by a management server according to an embodiment of the present invention.

FIG. 14 is a flowchart for explaining a processing executed by the I/O service management unit 103 included by the management server 101 according to an embodiment of the present invention.

The I/O service management unit 103 executes processes explained below based on the service type 1125 of the server 115 which is a management object (hereinafter, also referred to as the object server 115). A description will be given later of a method of determining the object server 115 in reference to FIG. 25.

The I/O service management unit 103 acquires the service type 1125 of the object server 115 from the server management table 112 when the processes are started (step 1031).

The I/O service management unit 103 determines the service type of the object server 115 based on the acquired service type 1125 (step 1032).

In a case where the acquired service type 1125 is "0", it is determined that the service type of the object server 115 is a device. In a case where the acquired service type 1125 is "1", it is determined that the service type of the object server 115 is a switch.

In a case where it is determined that the service type of the object server 115 is a switch, the I/O service management unit 103 calls the I/O device management unit 105 (step 1033), and the processes are finished (step 1035). The called I/O device management unit 105 executes processes for changing the assignment of the I/O device 117.

In a case where it is determined that the service type of the object server 115 is a device, the I/O service management unit 103 calls the I/O switch management unit 104 (step 1034), and the processes are finished (step 1035). The called I/O switch management unit 104 executes an adding processing or an unassigning processing.

In a case where there are the plural object servers 115, the I/O service management unit 103 repeatedly executes the processes described above (step 1031 through step 1035) for all of the object servers 115.

The I/O service management unit 103 may execute the processes described above periodically, or execute the processes described above after receiving an instruction from an operator of the management server 101. Or, the I/O service management unit 103 may execute the processes described above with the call from the I/O device performance acquiring unit 110 as a momentum.

Figure 15A:
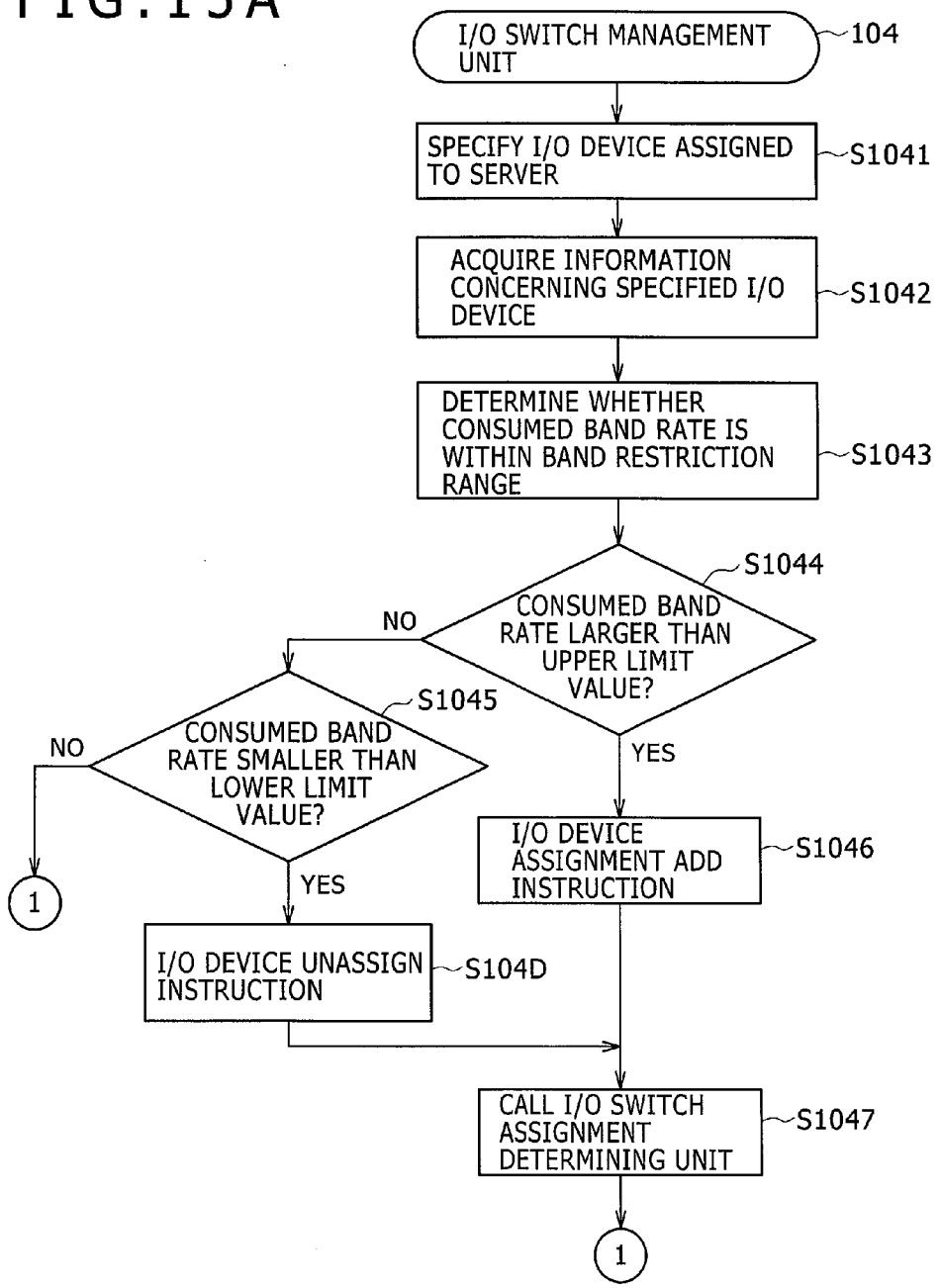
FIG. 15A is a flowchart of explaining a processing executed by an I/O switch management unit included by a management server according to an embodiment of the present invention.
Figure 15B:
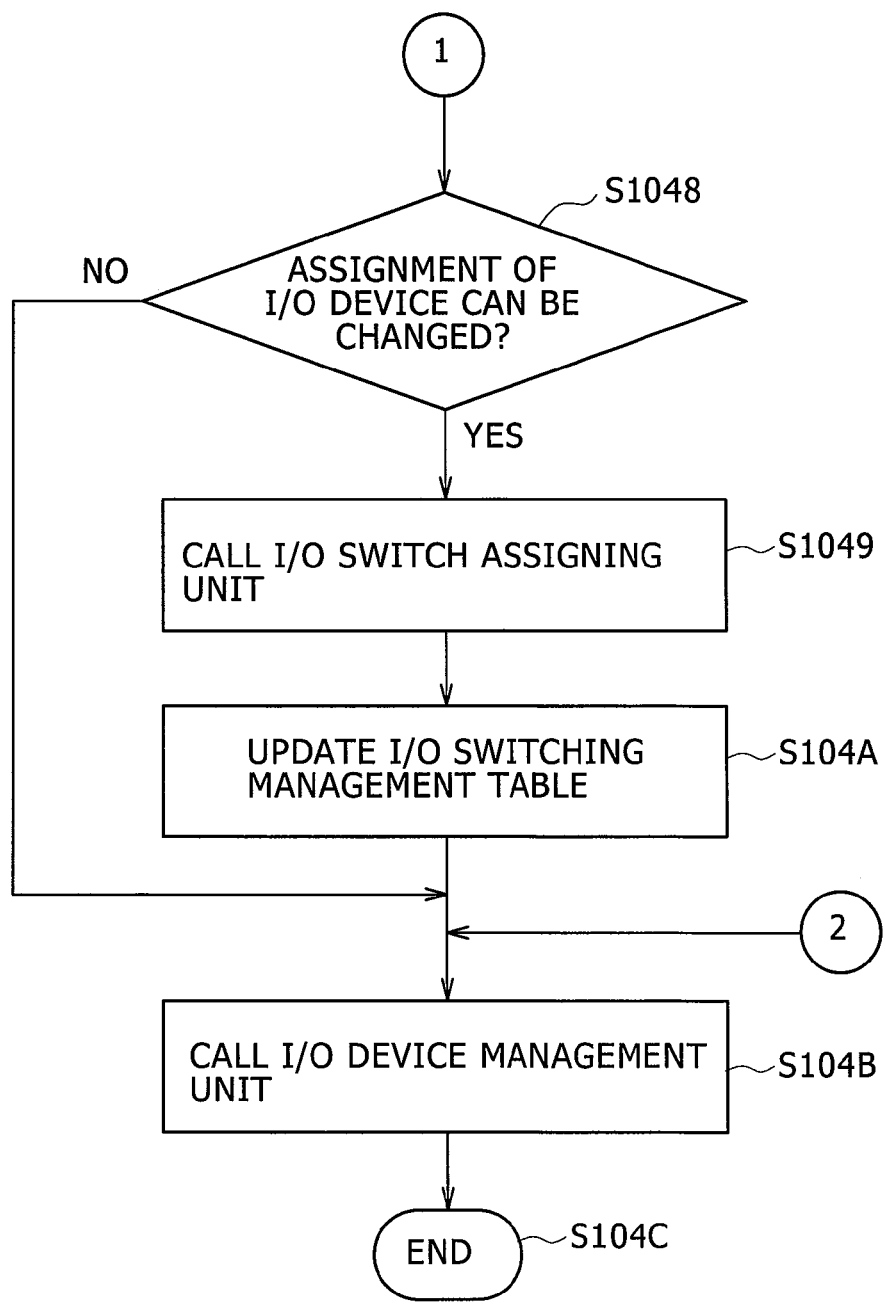
FIG. 15B is a flowchart of explaining a processing executed by an I/O switch management unit included by a management server according to an embodiment of the present invention.

FIG. 15A and FIG. 15B show a flowchart for explaining a processing executed by the I/O switch management unit 104 included by the management server 101 according to an embodiment of the present invention.

The I/O switch management unit 104 is called from the I/O service management unit 103 (step 1034). The I/O switch management unit 104 executes either one processing of the adding processing or the unassigning processing.

The I/O switch management unit 104 specifies the I/O device 117 assigned to the object server 115 in reference to the server management table 112 and the server I/O configuration information table 113 (step 1041).

Specifically, the I/O switch management unit 104 acquires the I/O definition 1124 from entry of the server identifier 1121 in correspondence with the object server 115 in reference to the server management table 112.

The I/O switch management unit 104 acquires a piece of information of the definition 1137 in agreement with the acquired I/O definition 1124 in reference to the server I/O configuration information table 113 based on the acquired I/O definition 1124. That is, there are acquired the I/O switch identifier 1131, the port number 1132, the connection device 1133, the communication destination 1134, and the importance degree 1135.

Thereby, the I/O switch management unit 104 can specify the I/O device 117 assigned to the object server 115.

The I/O switch management unit 104 acquires a piece of information with regard to the specified I/O device 117 in reference to the I/O switch management table 114 based on the piece of information acquired at step 1041 (step 1042).

Specifically, the I/O switch management unit 104 acquires the consumed band rate 1116 and the band restriction range 1117 with regard to the specified I/O device 117 in reference to the I/O switch management table 111 based on the acquired I/O identifier 1131 and the acquired port number 1132.

The I/O switch management unit 104 acquires the consumed band rates 1116 and the band restriction ranges 1117 of all of the I/O devices 117 specified at step 1041.

The I/O switch management unit 104 determines whether the consumed band rate 1116 is within the band restriction range 1117 for each I/O device 117 by using the acquired consumed band rate 1116 and the acquired band restriction range 1117 (step 1043).

That is, it is determined whether the total consumed bands in the single I/O device 117 are included within a prescribed range indicated by the band restriction range 1117. The determining processing is executed in consideration of the consumed bands of the total of the I/O devices 117.

For example, in a case of the I/O device 117 including CNA as an adapter, the determining processing is executed based on a total consumed band in combination with a consumed band in SAN and a consumed band in LAN.

The I/O switch management unit 104 determines whether the consumed band rate 1116 of the I/O device 117 is larger than the upper limit value of the band restriction range 1117 based on a result of the determining processing at step 1043 (step 1044).

In a case where it is determined that the consumed band rate 1116 of the I/O device 117 is larger than the upper limit value of the band restriction range 117, the I/O switch management unit 104 issues an assign-add instruction of the I/O device 117 to the I/O switch assignment determining unit 106 (step 1046), and proceeds to step 1047.

This is for resolving a deficiency in the band of the I/O device 117 assigned to the object server 115.

The assign-add instruction includes a piece of information with regard to the I/O device 117 having the deficient band. Specifically, the assign-add instruction includes the I/O switch identifier 1131, the port number 1132, the connection device 1133, the communication destination 1134, and the connection destination 1113. The assign-add instruction may include other information of the importance degree 1135.

In a case where it is determined that the consumed band rate 1116 of the I/O device 117 is equal to or less than the upper limit value of the band restriction range 1117, the I/O switch management unit 104 determines whether the consumed band rate 1116 is smaller than the lower limit value of the band restriction range 1117 (step 1045).

In a case where it is determined that the consumed band rate 1116 is smaller than the lower limit value of the band restriction range 1117, the I/O switch management unit 104 issues an unassignment instruction of the I/O device 117 to the I/O switch assignment determining unit 106 (step 104D), and proceeds to step 1047.

This is for effectively utilizing the I/O device 117 by unassigning the I/O device 117 having an excess band.

The unassignment instruction includes a piece of information with regard to the I/O device 117 of the unassignment object. Specifically, the unassignment instruction includes the I/O switch identifier 1131, the port number 1132, the connection device 1133, the communication destination 1134, and the connection destination 1113. The unassignment instruction may include other information of the importance degree 1135.

In a case where it is determined that the consumed band rate 1116 is equal to or more than the lower limit value of the band restriction range 1117, the I/O switch management unit 104 proceeds to step 104B.

That is, in a case where it is determined that the consumed band rate 1116 is within a range of the band restriction range 1117, excess and deficiency are not brought about in the band of the I/O device 117. Therefore, it is not necessary to change the assignment of the I/O device 117.

The I/O switch management unit 104 calls the I/O switch assignment determining unit 106 after issuing the assign-add instruction or the unassignment instruction (step 1047).

The called I/O switch assignment determining unit 106 executes a processing based on a piece of information included in the assign-add instruction or the unassignment instruction. A description will be given later of details of the processing executed by the I/O switch assignment determining unit 106 in reference to FIG. 16.

The I/O switch management unit 104 continues waiting until a result of the processing of the I/O switch assignment determining unit 106 is noticed.

In a case where the result of the processing from the I/O switch assignment determining unit 106 (refer to FIG. 16) is noticed, the I/O switch management unit 104 determines whether the assignment of the I/O device 117 can be changed based on the processing result (refer to FIG. 16) (step 1048). That is, it is determined whether either one of the assign-add processing or the unassignment processing can be executed.

In a case where it is determined that the assignment of the I/O device 117 cannot be changed, the I/O switch management unit 104 proceeds to step 104B.

In a case where it is determined that the assignment of the I/O device 117 can be changed, the I/O switch management unit 104 calls the I/O switch assignment unit 108 (step 1049).

At this occasion, the I/O switch management unit 104 notices the processing result of the I/O switch assignment determining unit 106 (refer to FIG. 16) to the I/O switch assigning unit 108.

Figure 16:
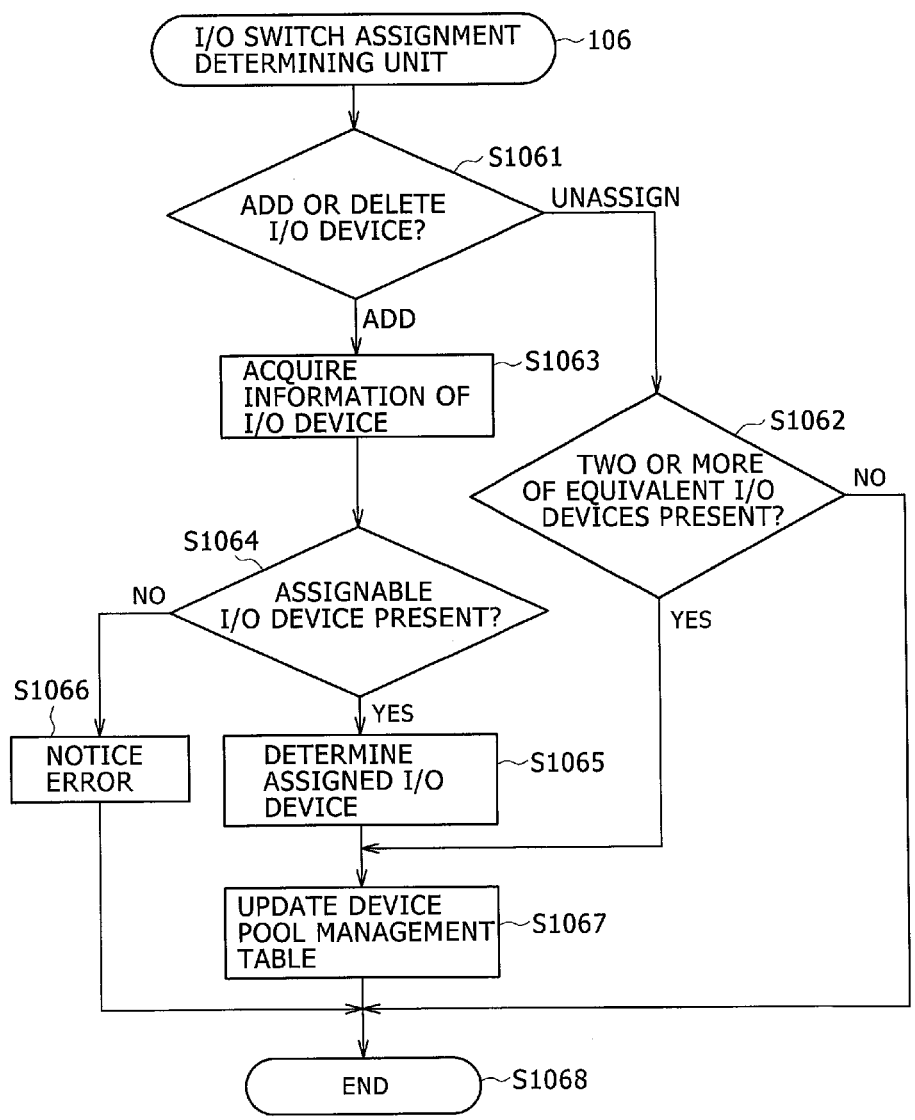
FIG. 16 is a flowchart of explaining details of a processing executed by an I/O switch determining unit included by a management server according to an embodiment of the present invention.

The I/O assigning unit 108 executes a processing based on the processing result of the I/O switch assignment determining unit 106 (refer to FIG. 16). A description will be given later of details of the processing executed by the I/O switch assigning unit 108 in reference to FIG. 17.

The I/O switch management unit 104 continues waiting until the processing result of the I/O assigning unit 108 is noticed.

In a case where the processing result is noticed from the I/O switch assigning unit 108, the I/O switch management unit 104 updates the I/O switch management table 111 based on the processing result (step 104A).

For example, in a case where the assign-add instruction is executed, there are updated the state 1115 of entry in correspondence with a port to which a newly assigned I/O device 117 is connected, the consumed band rate 1116, the band restriction range 1117, and the sharing 1118. A similar processing is executed also in a case where the unassignment instruction is executed.

Thereafter, the I/O switch management unit 104 calls the I/O device management unit 105 (step 104B), and finishes the processes (step 104C).

In a case where only one of the upper limit or the lower limit value is stored to the band restriction range 1117, only either one of step 1044 or step 1045 may be executed.

FIG. 16 is a flowchart for explaining details of a processing executed by the I/O switch assignment determining unit 106 included in the management server 101 according to an embodiment of the present invention.

The I/O switch assignment determining unit 106 is called from the I/O switch management unit 104 (step 1047). The I/O switch assignment determining unit 106 changes a logical connection between the I/O device 117 and the server 115 which are connected to the I/O switch 120.

The I/O switch assignment determining unit 106 determines which of an assign-add instruction or an unassignment instruction is an instruction issued from the I/O switch management unit 104 (step 1061).

In a case where it is determined that the instruction issued from the I/O switch management unit 104 is the unassignment instruction, the I/O switch assignment determining unit 106 determines whether the I/O device 117 which is an unassignment object can be assigned based on a piece of information included in the unassignment instruction (step 1062).

Specifically, the I/O switch assignment determining unit 106 determines whether two or more of the I/O devices 117 which are equivalent to the I/O device 117 that is the unassignment object are assigned to the server 115 which is assigned with the I/O device 117 of the unassignment object.

Here, the equivalent I/O device 117 indicates the I/O device 117 in which an adapter included in the I/O device 117 stays the same and a network of the communication destination of the I/O device 117 of the unassignment object stays the same. That is, the equivalent I/O device 117 indicates the I/O device 117 in which the connection device 1133 and the communication destination 1134 of the server I/O configuration information table 113 stay the same.

At step 1062, the following processing is executed.

First, the I/O switch assignment determining unit 106 extracts the connection device 1133 and the communication destination 1134 from the unassignment instruction of the I/O device 117.

Next, the I/O switch assignment determining unit 106 determines whether two or more of the I/O devices equivalent to the I/O device 117 of the unassignment object are assigned to the server 115 in reference to the server I/O configuration information table 113 based on the connection device 1133 and the communication destination 1134 which are extracted.

This is executed for determining whether an accessible communication destination is reduced by deleting the I/O device 17.

As a method of specifying the I/O device 117 assigned to the server 115 at step 1062, a method the same as that at step 1041 may be used, or, the processing result at step 1041 may be used.

In a case where it is determined that two or more of the I/O devices 117 which are equivalent to the I/O device 117 to be deleted are not assigned to the server 115, the I/O switch assignment determining unit 106 finishes the processes (step 1068).

In a case where it is determined that two or more of the I/O devices 117 which are equivalent to the I/O device 117 to be deleted are assigned to the server 115, the I/O switch assignment determining unit 106 acquires a piece of information for unassigning the I/O device 117, and proceeds to step 1067.

The piece of information for unassigning the I/O device 117 includes the identifier (I/O switch identifier 1131) of the I/O switch 120 which connects the I/O device 117 of the unassignment object, and the identifier of the port (port number 1132) to which the I/O device 117 of the unassignment object is connected.

At step 1061, in a case where it is determined that an instruction issued from the I/O switch management unit 104 is an assign-add instruction, the I/O assignment determining unit 106 acquires a piece of information of the I/O device 117 in an unassigned state in reference to the device pool management table 114 (step 1063).

Specifically, the I/O switch assignment determining unit 106 retrieves the I/O device 117 which stores the identifier of the device pool at the device pool assignment 1144 and the I/O device 117 in which the sharing is possible in the sharing state 1118. The I/O switch assignment determining unit 106 acquires the I/O switch identifier 1141 and the port number 1142 of corresponding entry.

The I/O switch assignment determining unit 106 acquires the connection destination 1113, the state 1115, and the sharing 1118 in reference to the I/O switch management table 111 based on the I/O switch identifier 1141 and the port number 1142 which are acquired. The I/O switch assignment determining unit 106 acquires the connection device 1133 and the communication destination 1134 in reference to the server I/O configuration information table 113 based on the I/O switch identifier 1141 and the port number 1142 which are acquired.

The I/O switch assignment determining unit 106 determines whether there is present the I/O device 117 which can be assigned to the I/O switch 120 to which the object server 115 is connected (step 1064).

Specifically, the I/O switch assignment determining unit 106 executes the following processing based on a piece of information acquired at step 1063.

The I/O switch assignment determining unit 106 determines whether the state 1115 of the I/O device 117 in a not-assigned-yet state is "normal". In a case where there is (are) one or more of the I/O device(s) 117 in which the state 1115 of the I/O device 117 in the not-assigned-yet state is "normal", it is determined that the I/O device 117 to be assigned is present.

In a case where it is determined that there is (are) one or more of the I/O device(s) in which the state 1115 is "normal", the I/O switch assignment determining unit 106 determines whether there is present the I/O device 117 in which the I/O type, and the network of the communication destination in the I/O device 117 having a deficient band stays the same.

The I/O switch assignment determining unit 106 extracts the connection destination 1113, the connection device 1133, and the communication destination 1134 which are included in the assign-add instruction.

The I/O switch assignment determining unit 106 determines whether all of the connection destination 1113, the connection device 1133, and the communication destination 1134 which are extracted are the same as the connection destination 1113, the connection device 1133, and the communication destination 1134 which are acquired at step 1063.

In a case where all of the connection destination 1113, the connection device 1133, and the communication destination 1134 which are extracted are the same as the connection destination 1113, the connection device 1133, and the communication destination 1134 which are acquired at step 1063, it is determined that there is the assignable I/O device 117.

The above-described are the processes executed at step 1064.

In a case where it is determined that the assignable I/O device 117 is not present at the I/O switch 120 to which the object server 115 is connected, the I/O switch assignment determining unit 106 notices an error to the I/O switch management unit 104 (step 1068), and finishes the processes (step 1068).

The error may be noticed to an operator of the management server 101. As a method of noticing the error, for example, there is conceivable a method of noticing the operator of the management server 101 that the I/O device 117 which can be assigned to the I/O switch 120 is not present.

In a case where it is determined that the I/O device 117 assignable to the I/O switch 120 is present, the I/O switch assignment determining unit 106 determines the I/O device 117 assigned to the server 115 (step 1065). The I/O switch assignment determining unit 106 acquires a piece of information for newly assigning the I/O device 117.

In a case where there are plural assignable I/O devices 117, there is conceivable a method of selecting the I/O device 117 having the least consumed band rate 1116 of the I/O switch management table 111. There may be a method of assigning the I/O devices 117 successively from the I/O devices 117 having the smaller port numbers 1112.

The piece of information for newly assigning the I/O device 117 includes the identifier (I/O switch identifier 1141) of the I/O switch 120 to which the assigned I/O device 117 is connected, and the identifier (port number 1142) of the port to which the I/O device 117 is connected.

The I/O switch assignment determining unit 106 updates the device pool management table 114 (step 1067), and finishes the processes (step 1068).

Specifically, the assignment state 1143 and the device pool assignment 1144 are updated.

For example, the I/O switch assignment determining unit 106 changes the assignment state 1143 of the port to which the unassigned I/O device 117 is connected is changed to "not assigned yet", and the identifier of the device pool is stored to the device pool assignment 1144. The updating is carried out similarly also in the assign-add processing.

The I/O switch assignment determining unit 106 notices the processing result to the I/O switch management unit 104.

Specifically, there is noticed either one of a notice stating that the assignment of the I/O device 117 is not changed or a notice stating that the assignment of the I/O device 117 can be changed.

Either one of the assign-add instruction or the unassignment instruction is included in the notice stating that the assignment of the I/O device 117 can be changed. An assign-add request includes the I/O switch identifier 1141 and the port number 1142. The unassignment instruction includes the I/O switch identifier 1131 and the port number 1132.

At step 1048, the I/O switch management unit 104 determines that the assignment of the I/O device 117 can be changed in a case where either one of the assign-add instruction or the unassignment instruction is included in the processing result.

Figure 17:
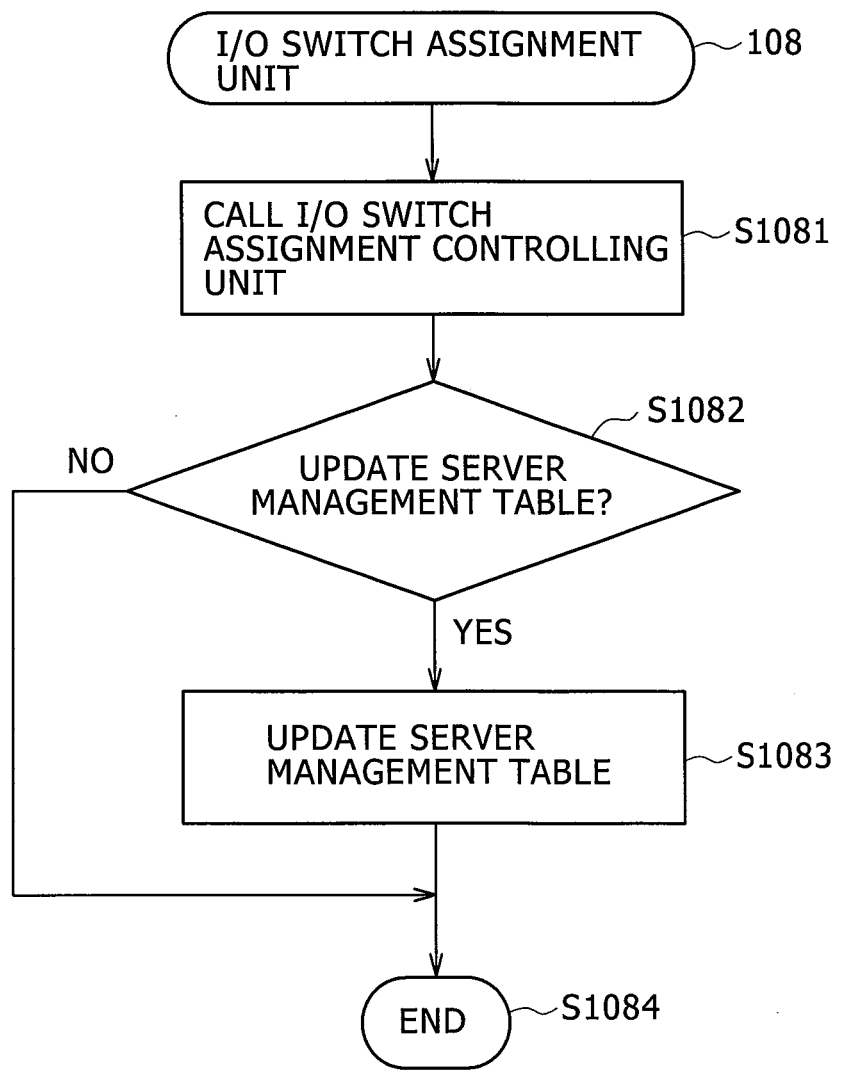
FIG. 17 is a flowchart of explaining details of a processing executed by an I/O switch assigning unit included by a management server according to an embodiment of the present invention.

FIG. 17 is a flowchart for explaining details of the processes executed by the I/O switch assigning unit 108 included by the management server 101 according to an embodiment of the present invention.

The I/O switch assigning unit 108 is called from the I/O switch management unit 104 (step 1049). The I/O switch assigning unit 108 transmits an assignment change request of the I/O device 117 based on the processing result of the I/O switch assignment determining unit 106.

The I/O switch assigning unit 108 calls the I/O switch assignment controlling unit 127 of SVP 119 (step 1081). The I/O switch determining unit 108 transmits the assignment change request of the I/O device 117 including the processing result of the I/O switch assignment determining unit 106 to the I/O switch assignment controlling unit 127.

A description will be given later of details of processes executed by the I/O switch assignment controlling unit 127 in reference to FIG. 18.

The I/O switch assigning unit 108 continues waiting until the processing result of the I/O switch assignment controlling unit 127 is noticed.

In a case where the processing result is noticed from the I/O switch assignment controlling unit 127, the I/O switch assigning unit 108 determines whether the server management table 112 is updated (step 1082).

Specifically, the I/O switch assigning unit 108 determines whether the I/O definition 1124 of the server management table 112 is changed. The determination can be determined based on the processing result noticed from the I/O switch assignment controlling unit 127.

In a case where it is determined that the server management table 112 is not updated, the I/O switch assigning unit 108 finishes the processes (step 1084).

In a case where it is determined that the server management table 112 is updated, the I/O switch assigning unit 108 updates the server management table 112 (step 1083), and finishes the processes (step 1084).

In the processing, the I/O definition 1124 of the server management table 112 is updated. For example, a new definition is changed, added, or deleted for the I/O definition 1124.

Figure 18:
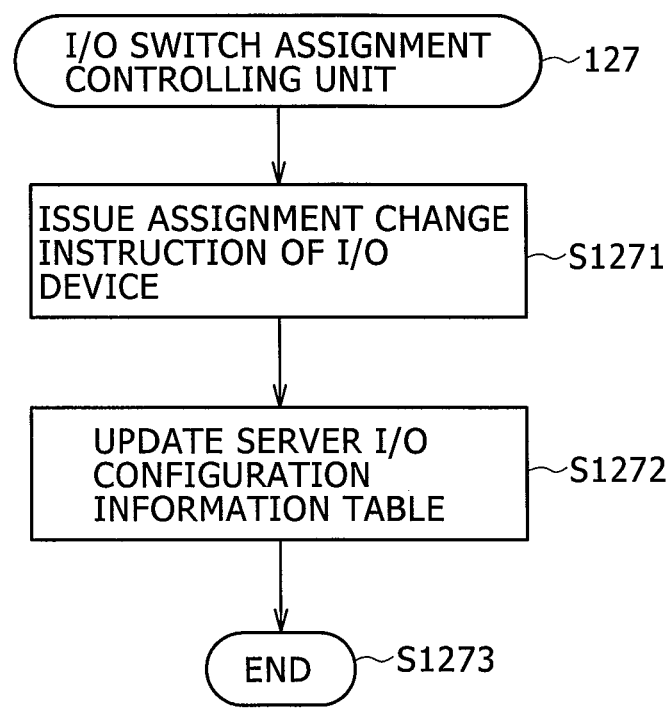
FIG. 18 is a flowchart of explaining details of a processing executed by an I/O switch assignment controlling unit included by SVP according to an embodiment of the present invention.

FIG. 18 is a flowchart for explaining details of processes executed by the I/O switch assignment controlling unit 127 included by SVP 119 according to an embodiment of the present invention.

The I/O assignment controlling unit 127 is called from the I/O switch assigning unit 108 (step 1081). The I/O switch assignment controlling unit 127 changes the assignment of the physical port (port 407) of the I/O switch 120 for the object server 115.

The I/O switch assignment controlling unit 127 issues the assignment change instruction of the I/O device 117 to the cross bus switch controlling unit 405 of the I/O switch 120 based on the assignment change request of the I/O device 117 received from the I/O switch assigning unit 108 (step 1271).

In a case where an assign-add instruction is included in a processing result of the I/O switch assignment determining unit 106, the I/O switch assignment controlling unit 127 specifies the I/O switch 120 at a notice destination of the assignment change instruction based on the I/O switch identifier 1141 included in the processing result. The I/O assignment controlling unit 127 issues the assign-add instruction including the port number 1142 included in the processing result to the specified I/O switch 120 as the assignment change instruction.

In a case where the unassignment instruction is included in the processing result of the I/O switch assignment determining unit 106, the I/O assignment controlling unit 127 executes a processing similar to the above-described processing by using the I/O switch identifier 1131 and the port number 1132 included in the processing result. In this case, the unassignment instruction including the port number 1132 is issued to the specified I/O switch 120 as the assignment change instruction.

The I/O switch controlling unit 127 updates the server I/O configuration information table 113 (step 1272), and finishes the processing (step 1273).

For example, in a case where the new I/O device 117 is assigned, new entry is added to the server I/O configuration information table 113, and respective pieces of information are stored to the entry. In a case where the I/O device 117 is unassigned, corresponding entry is deleted from the server I/O configuration information table 113.

The I/O switch assignment controlling unit 127 notices the processing result to the I/O switch assigning unit 108.

Figure 19:
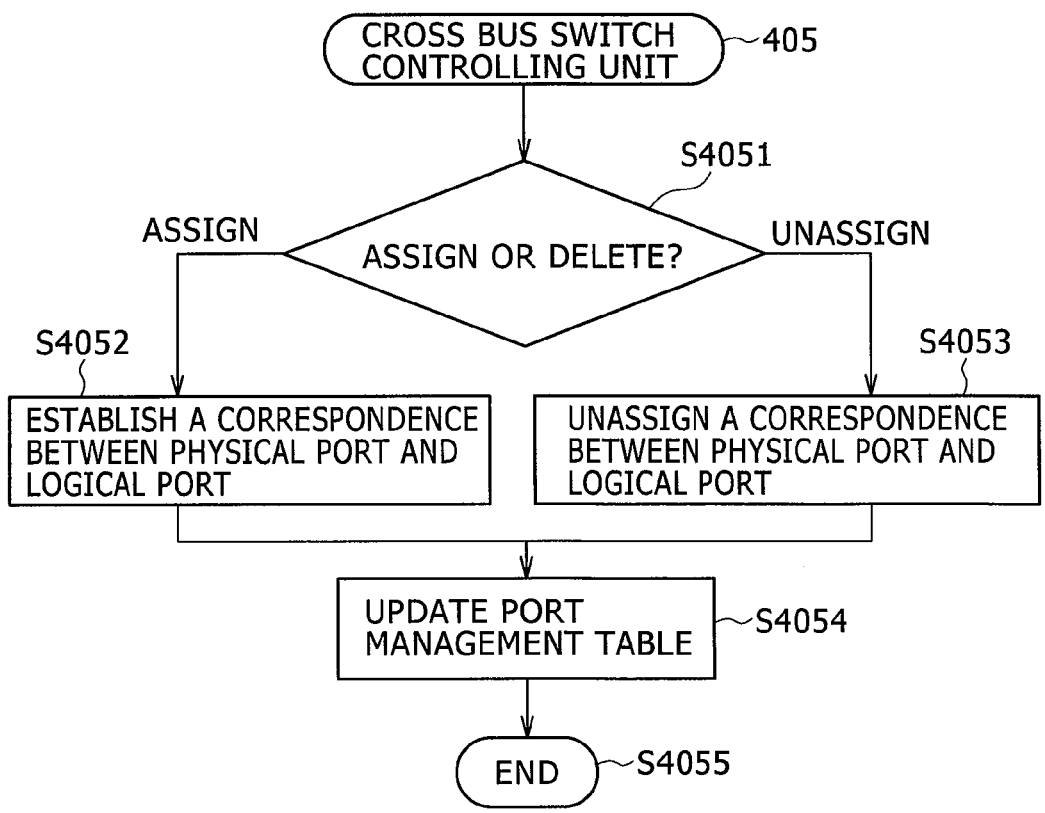
FIG. 19 is a flowchart of explaining details of a processing executed by a cross bus switch controlling unit included by an I/O switch according to an embodiment of the present invention.

FIG. 19 is a flowchart for explaining details of processes executed by the cross bus switch controlling unit 405 included by the I/O switch 120 according to an embodiment of the present invention.

The cross bus switch controlling unit 405 is called from the I/O switch assignment controlling unit 127 of SVP 119 (step 1271). The cross bus switch controlling unit 405 changes the logical port establishing a correspondence between the physical ports of the I/O device 117 and the server 115 which are connected to the I/O switch 120.

The cross bus switch controlling unit 405 determines which of an assign-add instruction or an unassignment instruction is the assignment change instruction issued from the I/O switch assignment controlling unit 127 (step 4051).

In a case where the assignment change instruction is the unassignment instruction, the cross bus switch controlling unit 405 makes the cross bus switch 404 execute a processing of unassigning the correspondence between the physical port and the logical port (step 4053), and proceeds to step 4054.

Specifically, there are deleted pieces of information stored to the assignment group 4062 of entry in correspondence with the port number 1132 and the logical port number 4063 included in the unassignment instruction.

In a case where it is determined that the assignment change instruction is the assign-add instruction, the cross bus switch controlling unit 405 makes the cross bus switch 404 execute a processing of corresponding the physical port and the logical port (step 4052), and proceeds to step 4054.

Specifically, the cross bus switch controlling unit 405 adds the identifier of the assigned group to be pertained to the assigned group 4062. The cross bus switch controlling unit 405 adds the logical port number 4063 to the assigned group. The logical port number 4063 stores a number which is different from the logical port number 4063 which has already been set to the assigned group.

The cross bus switch controlling unit 405 updates the port management table 406 (step 4054), and finishes the processes (step 4055).

That is, a piece of information is added to corresponding entry, or a piece of information of entry is deleted.

Figure 20:
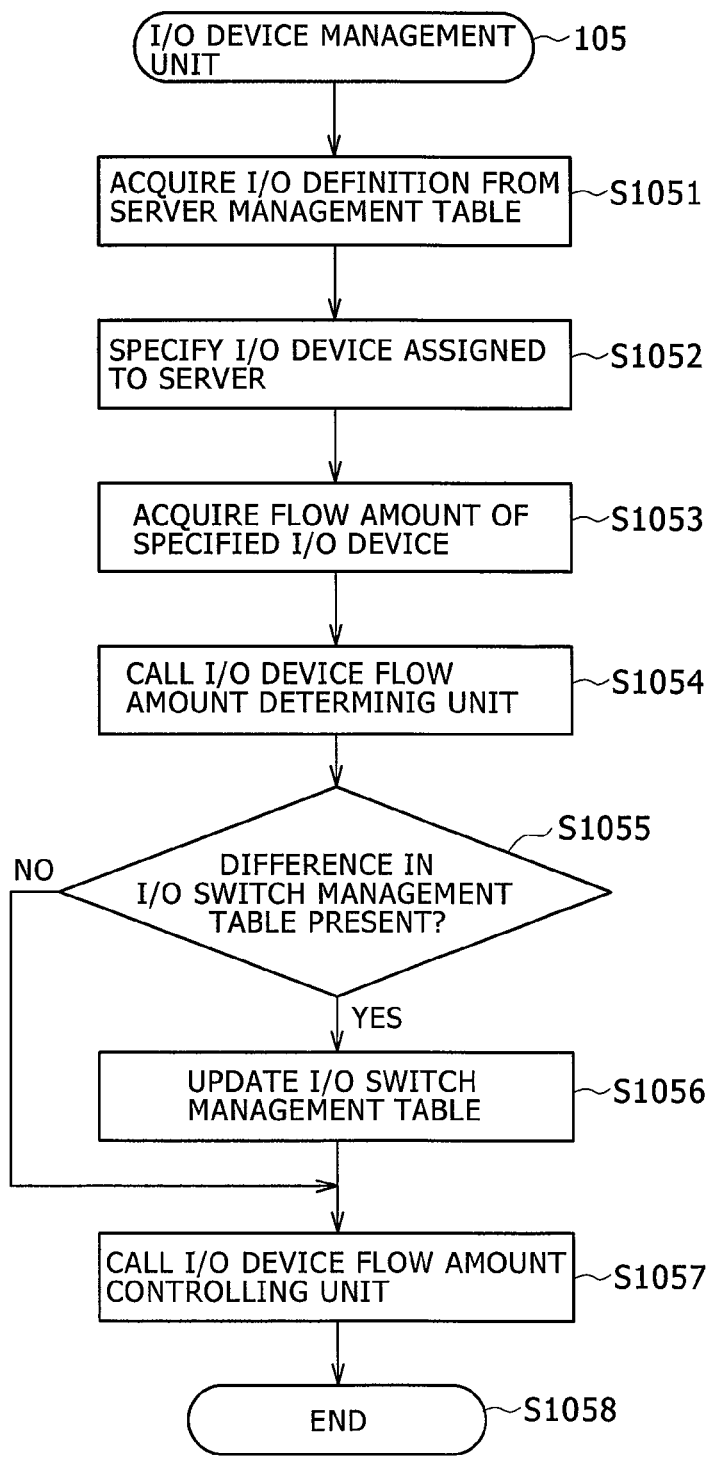
FIG. 20 is a flowchart of explaining details of a processing executed by an I/O device management unit included by a management server according to an embodiment of the present invention.

FIG. 20 is a flowchart for explaining details of a processing executed by the I/O device management unit 105 included in the management server 101 according to an embodiment of the present invention.

The I/O device management unit 105 manages flow amount information of the I/O device 117 assigned to the object server 115. The I/O device management unit 105 determines the I/O device 117 equivalent to the I/O device 117 assigned to the object server 115.

The I/O device management unit 105 acquires the I/O definition 1124 of the object server 115 from the server management table 112 (step 1051).

The I/O device management unit 105 specifies the I/O device 117 assigned to the object server 115 (step 1052).

Specifically, the I/O device management unit 105 specifies the I/O device assigned to the object server 115 in reference to the server I/O configuration information table 113 based on the I/O definition 1124 acquired at step 1051. At this occasion, there are acquired the I/O switch identifier 1131, the port number 1132, the connection device 1133, the communication destination 1134, and the importance degree 1135.

The I/O device management unit 105 acquires a flow amount of the specified I/O device 117 (step 1053).

Specifically, the I/O device management unit 105 acquires the consumed band rate 1116 of the specified I/O device 117 in reference to the I/O switch management table 111 based on the I/O switch identifier 1131 and the port number 1132 which are acquired at step 1052.

The I/O device management unit 105 calls the I/O device flow amount determining unit 107 (step 1054).

A description will be given later of details of processes executed by the I/O device flow amount determining unit 107 in reference to FIG. 21.

The I/O device management unit 105 continues waiting until a processing result of the I/O device flow amount determining unit 107 is noticed.

The I/O device management unit 105 to which the processing result is noticed from the I/O device flow amount determining unit 107 determines whether there is a difference in the I/O switch management table 111 based on the processing result noticed from the I/O device flow amount determining unit 107 (step 1055).

Specifically, the I/O device management unit 105 determines whether a difference is brought about in a piece of information of the I/O switch management table 111 acquired at step 1053 based on the processing result noticed from the I/O device flow amount determining unit 107.

In a case where it is determined that the difference is not present at the I/O switch management table 111, the I/O device management unit 105 proceeds to step 1057.

In a case where it is determined that the difference is present in the I/O switch management table 111, the I/O device management unit 105 updates the I/O switch management table 111 for reflecting the difference (step 1056).

The I/O device management unit 105 calls the I/O device flow amount controlling unit 109 (step 1057), and finishes the processes (step 1058). The I/O device management unit 105 combines pieces of information acquired at step 1051 through step 1053 to notice to the I/O device flow amount controlling unit 109.

A description will be given later of details of a processing executed by the I/O device flow amount controlling unit 109 in reference to FIG. 22.

Figure 21:
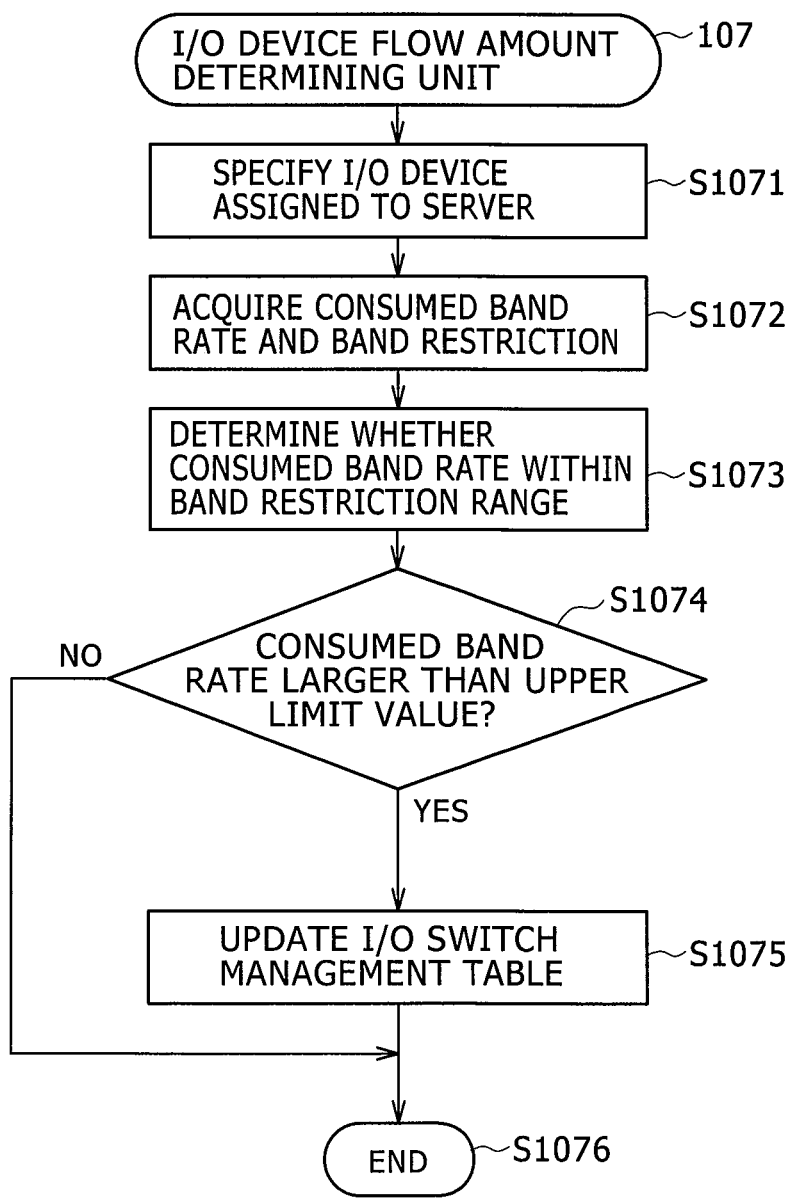
FIG. 21 is a flowchart of explaining a processing executed by an I/O device flow amount determining unit included by a management server according to an embodiment of the present invention.

FIG. 21 is a flowchart for explaining processes executed by the I/O device flow amount determining unit 107 included by the management server 101 according to an embodiment of the present invention.

The I/O device flow amount determining unit 107 is called from the I/O device management unit 105 (step 1057). The I/O device flow amount determining unit 107 executes a determining processing with regard to a flow amount of the I/O device 117 assigned to the object server 115.

Specifically, the I/O device flow amount determining unit 107 calculates the used band rate 1116 for each I/O type (LAN/SAN), and changes the service type 1125 to a switch in a case where the band restriction range 1117 is exceeded.

The I/O device flow amount determining unit 107 specifies the I/O device 117 assigned to the object server in reference to the server management table 112 and the server I/O configuration information table 113 (step 1071).

At step 1071, a method the same as that at step 1041 is used.

At step 1071, there are acquired the I/O switch identifier 1131, the port number 1132, the connection device 1133, the communication destination 1134, and the importance degree 1135 as pieces of information of the specified I/O device 117.

The I/O device flow amount determining unit 107 acquires a piece of information with regard to the specified I/O device 117 in reference to the I/O switch management table 111 based on the pieces of information acquired at step 1071 (step 1072).

Specifically, the I/O device flow amount determining unit 107 acquires the consumed band rate 1116 and the band restriction range 1117 of the specified I/O device 117 in reference to the I/O switch management table 111 based on the I/O identifier 1131 and the port number 1132 which are acquired at step 1071.

At this occasion, in a case where the specified I/O device 117 includes CNA as an adapter, the consumed band rate 1116 is acquired for each I/O type (LAN/SAN).

The I/O device flow amount determining unit 107 executes a processing described above with regard to all the specified I/O devices 117 (step 1072).

The I/O device flow amount determining unit 107 determines whether the consumed band rate 1116 is within the band restriction range 1117 for each I/O type (step 1073). This is because in the I/O device 117 including CNA as an adapter, there is a case where a band which can be used by SAN is not sufficient since the consumed band rate 1116 in LAN is high even when the consumed band rate 1116 of a total of the I/O device 117 is within the range of the band restriction range 1117.

In a case where the specified I/O device 117 includes CNA as an adapter, different determinations are executed with regard to the consumed band rate 1116 for LAN and the consumed band rate 1116 for SAN.

The I/O device flow amount determining unit 107 determines whether the consumed band rate 1116 of the I/O device 117 is larger the upper limit value of the band restriction range 1117 based on a result of the determining processing at step 1073 (step 1074).

In a case where it is determined that the consumed band rate 1116 of the I/O device 117 is equal to or less than the upper limit value of the band restriction range 1117, the I/O device flow amount determining unit 107 finishes the processes (step 1076).

In a case where the I/O device 117 includes CNA as an adapter, processes are executed respectively for the consumed band rate 1116 of LAN and the consumed band rate 1116 of SAN.

In a case where there are the plural specified I/O devices 117, the processing described above is executed for all of the I/O devices 117.

In a case where it is determined that the consumed band rate 1116 of the I/O device 117 is larger than the upper limit value of the band restriction range 1117, the I/O device flow amount determining unit 107 updates the I/O switch management table 111 (step 1075).

Specifically, the consumed band rate 1116 is updated such that all the consumed bands of the I/O devices 1117 are larger than the upper limit value of the band restriction range 1117.

The I/O device flow amount determining unit 107 changes the service type 1125 of the server management table 112 (step 1075), and finishes the processes (step 1076). Specifically, the service type 1125 is changed from "0" to "1".

An assign-add processing of the I/O device 117 is executed in a processing at step 1046 by processes at step 1075 and step 1076.

Figure 22:
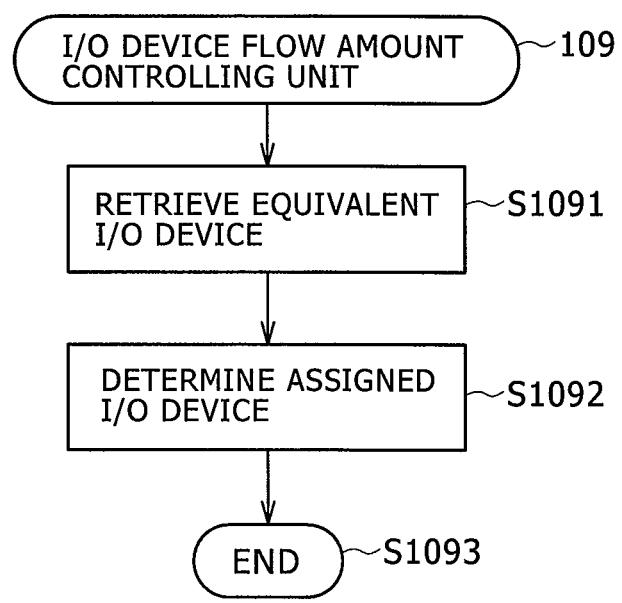
FIG. 22 is a flowchart of explaining a processing executed by an I/O device flow amount controlling unit included by a management server according to an embodiment of the present invention.

FIG. 22 is a flowchart for explaining processes executed by the I/O device flow amount controlling unit 109 included by the management server 101 according to an embodiment of the present invention.

The I/O device flow amount controlling unit 109 is called from the I/O device management unit 105 (step 1057). The I/O device flow amount controlling unit 109 selects the equivalent I/O device 117 from the I/O device 117 assigned to the object server 115 in order to change the assigned I/O device 117.

Here, the equivalent I/O device 117 indicates the I/O device 117 in which the connection device 1133 and the communication destination 1134 stay the same.

The I/O device flow amount controlling unit 109 retrieves the equivalent I/O device 117 from the I/O device 117 connected to the object server 115 (step 1091).

Specifically, first, the I/O device flow amount controlling unit 109 specifies the I/O device 117 connected to the object server 115. Next, the I/O device flow amount controlling unit

109 retrieves the I/O device 117 in which the connection device 1133 and the communication destination 1134 of the specified I/O device 117 stay the same.

The I/O device flow amount controlling unit 109 determines the assigned I/O device 117 for each I/O type from the retrieved I/O device 117, notices the determined I/O device 117 to the I/O controlling unit 126 (step 1092), and finishes the processes (step 1093).

Specifically, the I/O device flow amount controlling unit 109 determines the I/O device 117 having the least used band, that is, the least consumed band rate 1116 for each I/O type based on the consumed band rate 1116 of the retrieved I/O device 117.

The I/O device flow amount controlling unit 109 acquires a piece of information with regard to the determined I/O device 117. Specifically, there are acquired the identifier (I/O switch identifier 1131) of the I/O switch 120 connecting the determined I/O device 117, and the identifier (port number 1132) of the port to which the I/O device 117 is connected.

A method of determining the assigned I/O device 117 is not limited to the method described above. For example, there is conceivable a method of utilizing the band information of the network of the communication destination of the I/O device 117, the access destination of each I/O type, or the importance degree 1135 of the server I/O configuration information table 113 of the I/O device 117. For example, the method may be a method of determining to assign the fixed I/O device 117 in the specific I/O type.

The I/O device flow amount controlling unit 109 issues the assignment change instruction including the I/O switch identifier 1131 and the port umber 1132 to the I/O switch assignment controlling unit 127.

The I/O switch assignment controlling unit 127 executes the processes shown in FIG. 18. The cross bus switch controlling unit 405 executes processes shown in FIG. 19. Contents of the processes executed stay the same, and therefore, an explanation thereof will be omitted. The cross bus switch controlling unit 405 executes a processing of changing the correspondence between the physical port 407 and the logical port.

Figure 23:
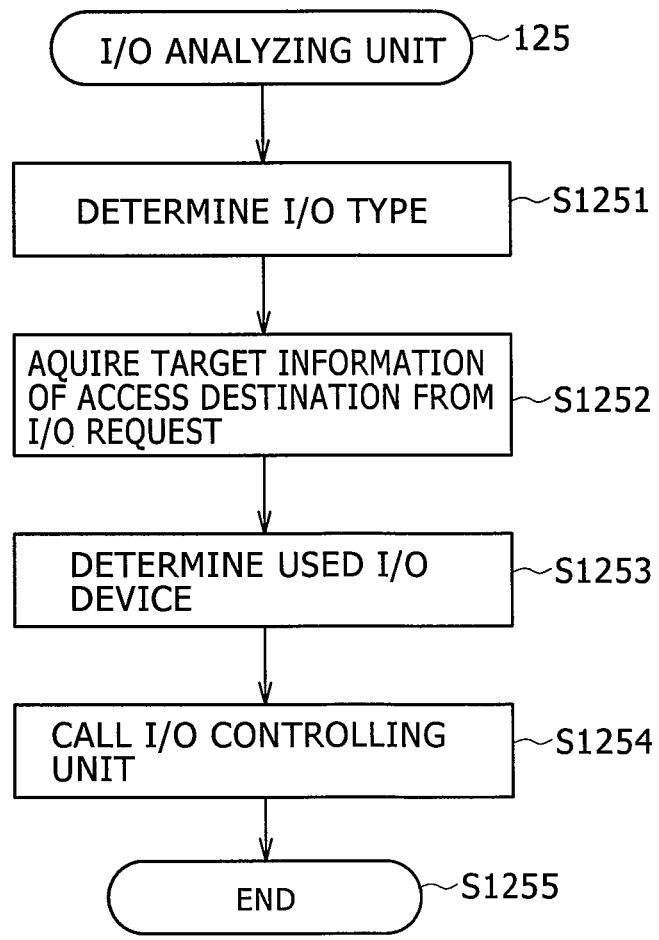
FIG. 23 is a flowchart of explaining a processing executed by an I/O analyzing unit included by a server according to an embodiment of the present invention.

FIG. 23 is a flowchart for explaining processes executed by the I/O analyzing unit 125 included by the server 115 according to an embodiment of the present invention.

The I/O analyzing unit 125 analyzes the I/O frame, and determines the communication destination to which the I/O device 117 is connected for each I/O request.

The I/O analyzing unit 125 determines the I/O type of the I/O request by receiving the I/O request from the server 115 and analyzing the I/O frame (step 1251).

The I/O analyzing unit 125 acquires a target and a piece of device information of the access destination from the received I/O request (step 1252).

According thereto, there is conceivable a method of acquiring the target and the piece of device information by analyzing an IP address stored to an IP header, and an MAC address of Ether frame in a case where the I/O frame is LAN.

When the I/O type is HBA, there is conceivable a method of identifying a piece of network information to which the target pertains based on the communication destination 1134 of the server I/O configuration information table 113 by analyzing SCSI ID information of SCSI protocol.

The I/O type unit 125 determines the used I/O device 117 from the I/O device 117 which is determined by the I/O device flow amount controlling unit 109 for each I/O type (step 1253).

Specifically, the used I/O device 117 is determined based on the I/O type, the target of the access destination, and the piece of device information.

In a case where there are plural I/O devices 117 assigned to the server 115, the I/O analyzing unit 125 determines the I/O device 117 using the I/O device 117 having the least band consumed band rate 1116.

The I/O analyzing unit 125 acquires a piece of information of the determined I/O device 117 from the I/O switch management table 111. Specifically, the I/O analyzing unit 125 acquires the I/O switch identifier 1111, the port number 1112, the consumed band rate 1116, and the band restriction range 1117.

Thereafter, the I/O analyzing unit 125 calls the I/O controlling unit 126 (step 1254), and finishes the processes (step 1255).

A description will be given later of details of processes executed by the I/O controlling unit 126 in reference to FIG. 24.

At this occasion, the I/O analyzing unit 125 also notices the I/O switch identifier 1111, the port number 1112, the consumed band rate 1116, and the band restriction range 1117.

Figure 24:
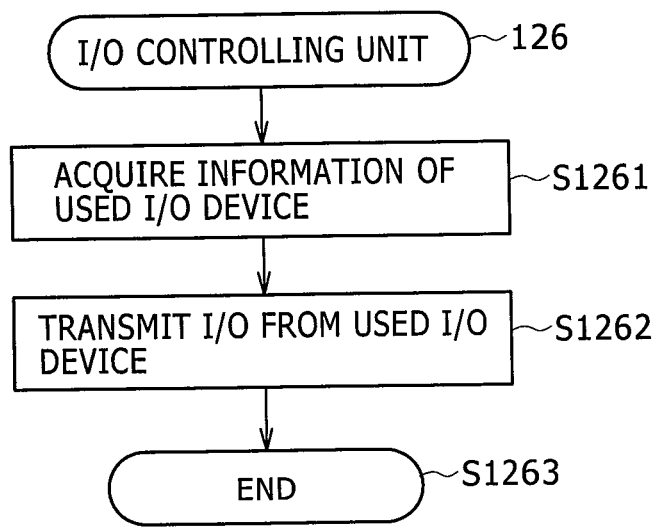
FIG. 24 is a flowchart of explaining a processing executed by an I/O controlling unit included by a server according to an embodiment of the present invention.

FIG. 24 is a flowchart for explaining processes executed by the I/O controlling unit 126 included by the server 115 according to an embodiment of the present invention.

The I/O controlling unit 126 is called from the I/O analyzing unit 125 (step 1254). The I/O controlling unit 126 transmits the I/O request received the I/O device 117 determined by the I/O analyzing unit 125.

The I/O controlling unit 126 acquires a piece of information of the I/O device 117 determined by the I/O analyzing unit 125 (step 1261).

Specifically, there are acquired the I/O switch identifier 1111, the port number 1112, the consumed band rate 1116, and the band restriction range 1117.

The I/O controlling unit 126 transmits the I/O request received by the I/O analyzing unit 125 to the determined I/O device 117 based on a piece of information acquired at step 1261 (step 1262), and finishes the processes (step 1263).

The I/O device 117 used at step 1262 is determined based on a piece of information of the consumed band rate 116 and the band restriction range 1117. Thereby, the consumed band rate of the I/O device 117 can be dispersed or biased.

Figure 25:
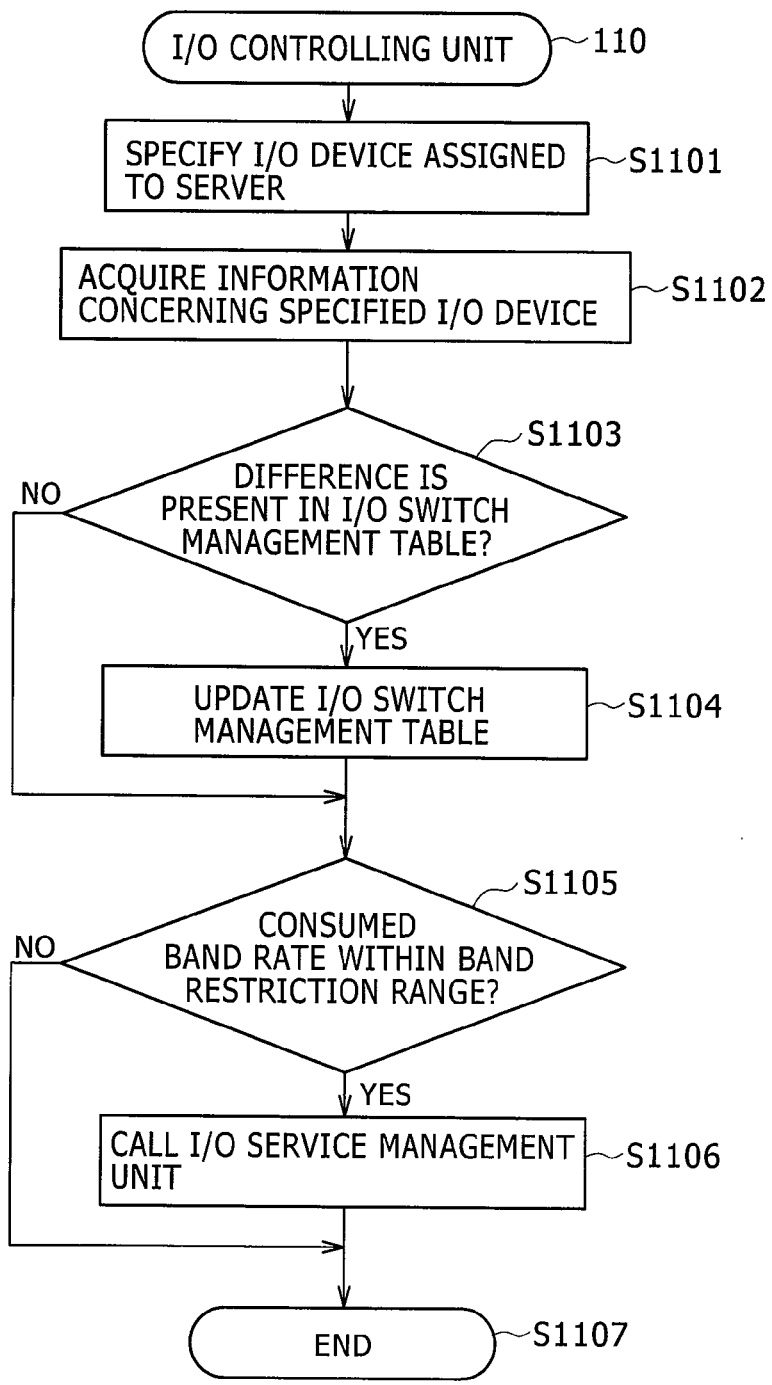
FIG. 25 is a flowchart of explaining a processing executed by an I/O device performance acquiring unit included by a management server according to an embodiment of the present invention.

FIG. 25 is a flowchart for explaining processes executed by the I/O device performance acquiring unit 110 included by the management server 101 according to an embodiment of the present invention.

The I/O device performance acquiring unit 110 periodically executes processes explained below.

The I/O device performance acquiring unit 110 acquires a flow amount of the I/O device 117 connected to the I/O switch 120. The I/O device performance acquiring unit 110 updates the I/O switch management table 111 based on the acquired flow amount of the I/O device 117.

The I/O performance acquiring unit 110 specifies the I/O device 117 assigned to the server 115 in reference to the server management table 112 (step 1101).

A processing at step 1101 is the same as the processing at step 1041. Therefore, at step 1101, there are acquired the I/O switch identifier 1131, the port number 1132, the connection device 1133, the communication destination 1134, and the importance degree 1135.

The I/O device performance acquiring unit 110 acquires a piece of information of the specified I/O device in reference to the I/O switch management table 111 (step 1102).

In the processing at step 1102, the consumed band rate 1116 and the band restriction range 1117 are acquired. As a method of acquiring the consumed band rate 1116 and the band restriction range 1117, there is conceivable a method of acquiring the consumed band rate 1116 and the band restriction range 1117 from the I/O device 117 or the I/O switch 120.

The I/O device performance acquiring unit 110 determines whether a difference is present in the I/O management table 111 (step 1103). That is, it is determined whether respective values of the I/O switch management table 111 are changed.

In a case where it is determined that the difference is not present in the I/O switch management table 111, the I/O device performance acquiring unit 110 finishes the processing (step 1105).

In a case where it is determined that the difference is present in the I/O switch management table 111, the I/O device performance acquiring unit 110 updates the I/O switch management table 111 (step 1104).

The I/O device performance acquiring unit 110 determines whether the consumed band rate 1116 is within the band restriction range 1117 for all of the I/O devices 117 by using the consumed band rate 1116 and the band restriction range 1117 (step 1105).

At step 1105, at least either one of step 1044 or step 1045 is executed.

In a case where it is determined that the consumed band rate 1116 is not within the band restriction range 1117, the I/O device performance acquiring unit 110 calls the I/O service controlling unit 103 (step 1106), and finishes the processes (step 1107).

In a case where it is determined that the consumed band rate 1116 is within the band restriction range 1117, the I/O device performance acquiring unit 110 finishes the processes (step 1107).

According to the embodiment of the present invention, in a case of changing the assignment of the I/O device 117 to the server 115, the I/O device 117 in consideration of the I/O type and the network topology information can be selected, and therefore, the assignment can be changed to the pertinent I/O device 117. Therefore, the flow amount of the I/O device 117 can be controlled.

Thereby, the load applied on the specific I/O device 117 can pertinently be dispersed. The I/O transfer efficiency of the I/O device 117 can be increased.

Although the explanation has been given of the embodiments of the present invention as described above, the embodiments are exemplifications for explaining the present invention and are not limited only to modes exemplifying the adaptive range of the present invention. Any combinations of the embodiments described above can be embodiments of the present invention.

What is claimed is:

1. An I/O device management method in a computer system which includes a computer, a plurality of I/O devices connected to a plurality of networks having different network configurations, an I/O switch assigning a first I/O device of the I/O devices to the computer so as to be able to communicate with a first one of the networks connected to the first I/O device, and a management computer managing the first I/O device assigned to the computer, the management computer having a first processor, a first memory connected to the first processor, and a first network interface connected to the first processor, and the computer having a second processor, a second memory connected to the second processor, and a second network interface connected to the second processor, the I/O device management method comprising:

a first step of acquiring, by the management computer, a piece of I/O device configuration information of the first I/O device assigned to the computer, and a piece of network configuration information of the first one of the networks connected with the first I/O device assigned to the computer;

a second step of acquiring, by the management computer, a flow amount indicating an amount of data transmitted and received via the first I/O device assigned to the computer for each of a plurality of I/O types of the data transmitted and received via the first I/O device;

a third step of determining, by the management computer, whether to change the first I/O device assigned to the computer to another one of the I/O devices based on the flow amount acquired for each of the plurality of I/O types, the piece of the acquired I/O device configuration information, and the piece of the acquired network configuration information; and a fourth step of issuing, by the management computer, an assignment change instruction to the I/O switch to change the first I/O device assigned to the computer to the other one of the I/O devices.

2. The I/O device management method according to claim 1, wherein the second step includes:
acquiring a consumed band amount at the first I/O device, and a usable band amount indicating a band usable at the first I/O device, wherein the third step includes:
determining whether the flow amount of the first I/O device assigned to the computer is deficient based on the acquired consumed band amount and the acquired usable band amount; and
determining the other one of the I/O devices to be newly assigned to the computer when the flow amount of the first I/O device assigned to the computer is deficient.

3. The I/O device management method according to claim 1, wherein the second step includes:
acquiring a consumed band amount at the first I/O device, and a usable band amount indicating a usable band at the first I/O device, wherein the third step includes:
determining whether there is an excess band amount at the first I/O device assigned to the computer based on the acquired consumed band amount and the acquired usable band amount; and
determining whether the first I/O device assigned to the computer can be unassigned when the excess band amount is present at the first I/O device assigned to the computer, and wherein the fourth step includes:
issuing an unassignment instruction for unassigning the first I/O device to the computer when the assignment of the first I/O device having the excess band amount can be unassigned.

4. The I/O device management method according to claim 1, wherein the second step includes:
acquiring consumed band amounts for each of the plurality of I/O types consumed at the first I/O device, and usable band amounts at the first I/O device, and wherein the third step includes:
determining whether the first I/O device is deficient in the consumed band amount of at least one of a plurality of I/O types in the first I/O device assigned to the computer based on the acquired consumed band amounts, and the acquired usable band amounts for each of the plurality of I/O types consumed at the first I/O device;

retrieving the other one of the I/O devices capable of transmitting and receiving data to and from the first one of the networks connected to the first I/O device when the first I/O device is deficient.

5. The I/O device management method according to claim 4, wherein the other one of I/O devices can transmit and receive the data having the same plurality of I/O types as the first I/O device, and the network configuration of the first one of the networks connected to the first I/O device stays the same.

6. The I/O device management method according to claim 1, wherein the first I/O device and at least one other of the I/O devices are assigned to the computer, and further comprising:
acquiring data transmitted from the computer by the I/O switch;
extracting the plurality of I/O types and transmission destinations of the acquired data from the acquired data by the I/O switch;
determining which of the I/O devices are transmitting the acquired data from the I/O devices assigned to the computer based on the plurality of I/O types of the acquired data and the transmission destinations of the acquired data by the I/O switch; and
transmitting the acquired data from the determined I/O devices by the I/O switch.

7. A computer system comprising:
a computer;
a plurality of I/O devices connected to a plurality of networks having different network configurations;
an I/O switch assigning a first I/O device of the I/O devices to the computer so as to be able to communicate with a first one of the networks connected to the first I/O device; and
a management computer managing the first I/O device, where the management computer includes a first processor, a first memory connected to the first processor, and a first network interface connected to the first processor,
wherein the computer includes a second processor, a second memory connected to the second processor, and a second network interface connected to the second processor, and
wherein the second memory of the management computer stores instructions, that when executed by the second processor, cause the second processor to:
acquire a piece of I/O device configuration information of the first I/O device assigned to the computer, and a piece of network configuration information of the first one of the networks connected with the first I/O device assigned to the computer;
acquire a flow amount indicating an amount of data transmitted and received via the first I/O device assigned to the computer for each of a plurality of I/O types of the data transmitted and received via the first I/O device;
determine whether to change the first I/O device assigned to the computer to another one of the I/O devices based on the flow amount acquired for each of the plurality of I/O types, the piece of the acquired I/O device configuration information and the piece of the acquired network information, and
issue an assignment change instruction to the I/O switch to change the first I/O device assigned to the computer to the other one of the I/O devices.

8. The computer system according to claim 7, wherein the flow amount acquired for each of the plurality of I/O types includes a consumed band amount at the first I/O device, and a usable band amount at the first I/O device, wherein the second memory of the management computer stores instructions, that when executed by the second processor, cause the second processor to:
determine whether the flow amount of the first I/O device assigned to the computer is deficient based on the acquired consumed band amount and the acquired usable band amount when determining to change the change the first I/O device;
determine the other one of the I/O devices to be newly assigned to the computer when the flow amount of the first I/O device assigned to the computer is deficient.

9. The computer system according to claim 7, wherein the flow amount acquired for each of the plurality of I/O types includes a consumed band amount in the first I/O device, and a usable band amount usable in the first I/O device, wherein the second memory of the management computer stores instructions, that when executed by the second processor, cause the second processor to:
determine whether an excess band is present in the first I/O device assigned to the computer based on the acquired consumed band amount and the acquired usable band amount when changing the assignment of the first I/O device to the computer is determined;
determine whether the assignment of the first I/O device having the excess band can be unassigned when the excess band is present in the first I/O device assigned to the computer; and
issue an unassignment instruction for unassigning the first I/O device to the computer when the assignment of the first I/O device having the excess band can be unassigned as the assignment change instruction.

10. The computer system according to claim 7, wherein the flow amount acquired for each of the plurality of I/O types includes a consumed band amount of each of the plurality of I/O types consumed at the first I/O device, and a usable band amount in the first I/O device, wherein the second memory of the management computer stores instructions, that when executed by the second processor, cause the second processor to:
determine whether the first I/O device is deficient in the consumed band amount of at least one of the plurality of I/O types in the first I/O device assigned to the computer based on the acquired consumed band amounts, and the acquired usable band amounts in each of the plurality of I/O types consumed at the first I/O device;
retrieve the other one of the I/O devices capable of transmitting and receiving data to and from the first one of the networks connected to the first I/O device when the first I/O device is deficient.

11. The computer system according to claim 10, wherein the other one of the I/O devices can transmit and receive the data having the same plurality of I/O types as the first I/O device, and the piece of network configuration of the first one of the networks connected with the first I/O device stays the same.

12. The computer system according to claim 7, wherein the first I/O device and at least one other of the I/O devices are assigned to the computer, and wherein the I/O switch:
acquires data transmitted from the computer;
extracts the plurality of I/O types of the data and transmission destinations of the acquired data;
determines which of the I/O devices are transmitting the acquired data from the I/O devices assigned to the computer based on the plurality of I/O types of the acquired data and the transmission destinations of the acquired data; and transmits the acquired data from the determined I/O devices.

13. A non-transitory, computer readable medium storing an I/O device management program causing a management computer to execute a process for managing a computer, a plurality of I/O devices connected to a plurality of networks having different network configurations, an I/O switch assigning a first I/O device of the I/O devices to the computer so as to be able to communicate with a first one of the networks connected to the first I/O device, and the first I/O device assigned to the computer, the management computer comprising a first processor, a first memory connected to the first processor, and a first network interface connected to the first processor, the process comprising:
a first procedure of acquiring a piece of I/O device configuration information of the first I/O device assigned to the computer, and a piece of network configuration information of the first one of the networks connected with the first I/O device assigned to the computer;
a second procedure of acquiring a flow amount indicating an amount of a data transmitted and received via the first I/O device assigned to the computer for each of a plurality of I/O types of the data transmitted and received via the first I/O device;
a third procedure of determining whether to change the first I/O device assigned to the computer to another one of the I/O devices based on the flow amount acquired for each of the plurality of I/O types, the piece of acquired I/O device configuration information and the piece of acquired network configuration information; and
a fourth procedure of issuing an assignment change instruction to the I/O switch to change the first I/O device assigned to the computer to the other one of the I/O devices.

14. The computer readable medium storing the I/O management program according to claim 13,
wherein the second procedure further includes acquiring a consumed band amount in the first I/O device, and a usable band amount in the first I/O device,
wherein the third procedure further includes:
determining whether the flow amount of the first I/O device assigned to the computer is deficient based on the acquired consumed band amount and the acquired band amount; and
determining the other one of the I/O devices to be newly assigned to the computer when the flow amount of the first I/O device assigned to the computer is deficient.

15. The computer readable medium storing the I/O management program according to claim 13,
wherein the second procedure further includes:
acquiring a consumed band amount in the first I/O device, and a usable band amount in the first I/O device,
wherein the third procedure further includes:
determining whether an excess band amount is present in the first I/O device assigned to the computer based on the acquired consumed band amount and the acquired usable band amount; and
determining whether the assignment of the first I/O device having the excess band amount can be unassigned when the excess band amount is present in the first I/O device assigned to the computer, and
wherein the fourth procedure further includes:
issuing an unassignment instruction for unassigning the first I/O device to the computer when the assignment of the first I/O device having the excess band amount can be unassigned.

16. The computer readable medium storing the I/O management program according to claim 13,
wherein the second procedure further includes:
acquiring a consumed band amount for each of the plurality of I/O types consumed in the first I/O device, and a usable band amount in the first I/O device, and
wherein the third procedure further includes:
determining whether the first I/O device is deficient in the consumed band amount of at least one of the plurality of I/O types in the first I/O device assigned to the computer based on the acquired consumed band amounts for each of the I/O types, and the acquired usable band amount;
retrieving the other one of I/O devices capable of transmitting and receiving data to and from the first one of the networks connected to the first I/O device when the object first I/O device is deficient.

17. The computer readable medium storing the I/O management program according to claim 16,
wherein the other one of the I/O devices can transmit and receive the data having the same plurality of I/O types as the first I/O device, and the network configuration of the first one of the networks connected to the first I/O device stays the same.

* * * * *